United States Patent
Minami et al.

(10) Patent No.: US 11,805,142 B2
(45) Date of Patent: Oct. 31, 2023

(54) COMMUNICATION SYSTEM AND COMMUNICATION METHOD

(71) Applicant: NIPPON TELEGRAPH AND TELEPHONE CORPORATION, Tokyo (JP)

(72) Inventors: Takuya Minami, Musashino (JP); Tomoyasu Sato, Musashino (JP); Naoto Fujiki, Musashino (JP); Takeshi Nakatsuru, Musashino (JP); Masami Izumi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 538 days.

(21) Appl. No.: 17/252,740

(22) PCT Filed: Jun. 26, 2019

(86) PCT No.: PCT/JP2019/025447
§ 371 (c)(1),
(2) Date: Dec. 16, 2020

(87) PCT Pub. No.: WO2020/004489
PCT Pub. Date: Jan. 2, 2020

(65) Prior Publication Data
US 2021/0160270 A1   May 27, 2021

(30) Foreign Application Priority Data
Jun. 29, 2018   (JP) .................... 2018-124884

(51) Int. Cl.
*H04L 9/40* (2022.01)

(52) U.S. Cl.
CPC ...... *H04L 63/1425* (2013.01); *H04L 63/1416* (2013.01); *H04L 63/1466* (2013.01); *H04L 63/20* (2013.01)

(58) Field of Classification Search
CPC ............. H04L 63/1425; H04L 63/1416; H04L 63/1466; H04L 63/20; H04L 12/66; G06N 20/00
See application file for complete search history.

(56) References Cited

U.S. PATENT DOCUMENTS

| 9,419,981 B2 * | 8/2016 | Stolfo ................... H04L 63/145 |
| 10,614,214 B2 * | 4/2020 | McMurdie ............ G06F 21/554 |

(Continued)

OTHER PUBLICATIONS

Alaxala, "Network Security Whitelist Feature", Alaxala Networks Corporation, 4 pages with English Translation.
Zingbox, "Enabling the Internet of Trusted Things", 3 pages.

*Primary Examiner* — J. Brant Murphy
(74) *Attorney, Agent, or Firm* — XSENSUS LLP

(57) ABSTRACT

A communication system including an operational network including a host and a learning and detection server, and a staging network including a host of the same type as the host, a test execution server, and a learning and detection server. The test execution server performs a communication test by transmitting test communication in a normal state to the host and receiving communication performed by the host. The learning and detection server learns the communication of the host, generates an initial model for detecting an anomalous communication of the host, and transmits the initial model to the learning and detection server. The learning and detection server learns the communication of the host and generates a model for detecting an anomalous communication of the host, while monitoring the communication of the host using the initial model received from the learning and detection server.

5 Claims, 18 Drawing Sheets

(56) References Cited

U.S. PATENT DOCUMENTS

2019/0156244 A1\* 5/2019 Faulhaber, Jr. ....... G06F 9/5072
2019/0205531 A1\* 7/2019 McMurdie ............ G06F 21/552

\* cited by examiner

COMMUNICATION SYSTEM AND COMMUNICATION METHOD

CROSS-REFERENCE TO RELATED APPLICATIONS

The present application is based on PCT filing PCT/JP2019/025447, filed Jun. 26, 2019, which claims priority to JP 2018-124884, filed Jun. 29, 2018, the entire contents of each are incorporated herein by reference.

TECHNICAL FIELD

The present invention relates to a communication system and a communication method.

BACKGROUND ART

Increasing use of ICT (Information and Communication Technology) in economic activities and living environments in recent years has provided convenience. On the other hand, it has led to increased effect in the event of a security incident and the importance of security measures is growing day by day.

For ever-changing threats in cyber areas, study and development of security protection techniques have been under way at security vendors and research institutes. Nevertheless, unknown attacks that cannot be detected with the existing detection rules, such as zero-day attacks, constitute a great threat at present. As a countermeasure against such unknown attacks, an anomaly detection scheme that defines normal states and identifies a state not identifiable as one of the normal states as an abnormal state has started to be employed.

In an ICT environment, e.g., an environment where all the things can connect to a network represented by IoT (Internet of Things), many of appliances that are targeted by cyber-attacks are attacked via a network. Thus, monitoring of communication flowing in a network is effective as a security measure and application of the anomaly detection scheme to monitoring of network communications can be said to be a further effective scheme.

In the anomaly detection scheme, a current trend is to learn the definition of normal states, and in the case of applying the anomaly detection scheme to network communication monitoring, a method that defines the normal states via learning for communication groups flowing in a network is used.

The anomaly detection scheme for network communication monitoring involves two phases: a period in which communications flowing in a network defined as a normal state are learned as communications in the normal state (hereinafter, learning phase), and a period in which communication flowing in the network is detected as anomalous if it cannot be identified as being in the same state as the learned state after completion of learning (hereinafter, detection phase). When the anomaly detection scheme is used in practice, the learning phase is performed and thereafter the detection phase is performed.

Data generated in the learning phase representing the normal states is expressed by numerical values and/or a character string, such as destination of communication and a protocol, in the case of communication flow information, for example. For communication features as input to machine learning, data representing the normal states is expressed by a mathematical model (a collection of mathematical expressions and parameters). Data representing the normal states varies depending on how the anomaly detection scheme is implemented. In the following description, such data representing the normal states will be called a model.

An example of the anomaly detection scheme is network switch products that have whitelist functionality consisting of learning and detection functions. Such a network switch product learns each of communication flows (the destination of communication, the protocol, and the like) of traffic flowing in a network as normal (defines them as a whitelist) in the learning phase, and detects a communication flow different from a normal one as an anomaly in the detection phase (see Non-Patent Literature 1).

Another example is a technique that models normal patterns of a communication of appliances, mainly an IoT appliances, via machine learning, defines them as the normal states, and detects an anomaly by identifying communication having a pattern that does not fit the model (see Non-Patent Literature 2).

CITATION LIST

Non-Patent Literature

Non-Patent Literature 1: ALAXALA Networks network security whitelist function, [online], [searched on Jun. 14, 2018], the internet <URL:https://www.alaxala.com/jp/solution/security/wl/>

Non-Patent Literature 2: Zingbox Enabling the Internet of Trusted Things, [online], [searched on Jun. 14, 2018], the internet <URL:https://www.zingbox.com/>

SUMMARY OF THE INVENTION

Technical Problem

In the implementation of the anomaly detection scheme mentioned above, the learning phase is essential. One problem with the anomaly detection scheme here is that if there is an intrusion of anomalous communication during the learning phase, that communication would be learned as part of the normal states and the intrusive anomalous communication could not be detected in the subsequent detection phase.

That is to say, the anomaly detection scheme, which employs the means of learning, has a disadvantage of the learning phase being a vulnerable period.

Thus, when the learning phase is conducted, a special arrangement for ensuring the soundness of the network during the learning phase is needed, which involves initially constructing a network based on trusted appliances, performing the learning phase in that environment and then transitioning to the detection phase.

In some cases, however, the initial construction cannot be the starting point due to network operation. This can be the case when a software alteration is made to connected appliances during network operation or when the normal states of communication change with time along with a change to an operation policy, for example. In the case of the technique described in Non-Patent Literature 1, when there is a change in the normal states of the network in operation, it is necessary to switch back to the learning phase and update the definition of the normal states.

When the technique descried in Non-Patent Literature 1 is used, there is a challenge of difficulty in ensuring that there is no anomaly present in the learning phase when relearning is performed, that is, ensuring the soundness of the learning phase in relearning.

For such a challenge, it is possible to minimize a vulnerable period during the learning phase for each appliance by phase switching on a per-appliance basis if a mechanism to monitor individual appliances is created and processing for creating a normal state for each connected appliance is performed, as in the technique described in Non-Patent Literature 2. However, the technique described in Non-Patent Literature 2 is no different from the technique described in Non-Patent Literature 1 in that it has the challenge of difficulty in ensuring the soundness of the learning phase in relearning.

Additionally, in the techniques described in Non-Patent Literatures 1 and 2, even if an anomaly could be detected during the learning phase, the learning phase cannot be advanced until it is analyzed whether the detection was caused by a real anomaly or a normal state was erroneously detected and it is determined whether to incorporate it into the normal states or not. Thus, there is also a potential challenge of prolongation of the learning period.

In view of the foregoing, an object of the present invention is to provide a communication system and a communication method that carry out the learning phase more securely when detecting anomalous communication.

Means for Solving the Problem

To solve the challenge described above and attain the object, a communication system according to the present invention is a communication system including a first network and a second network, the first network including: a first communication device; a testing device for performing a communication test by transmitting test communication in a normal state to the first communication device and receiving communication performed by the first communication device; and a first server device for learning the test communication and the communication performed by the first communication device, generating an initial model for detecting an anomalous communication of the first communication device, and transmitting the initial model to the second network, and the second network including: a second communication device of the same type as the first communication device; and a second server device for learning the communication of the second communication device and generating a first model for detecting an anomalous communication of the second communication device, while monitoring the communication of the second communication device using the initial model received from the first server device.

Effects of the Invention

The present invention can carry out the learning phase more securely when detecting anomalous communication.

DESCRIPTION OF EMBODIMENTS

Figure 1:
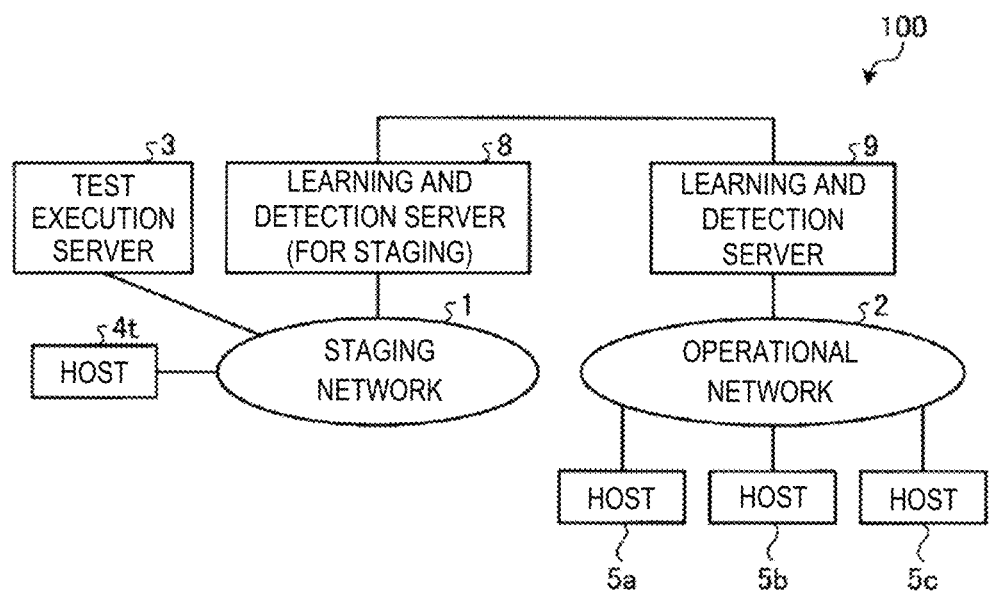
FIG. 1 is a diagram showing an exemplary configuration of a communication system in Embodiment 1.

Embodiments of the present invention are described in detail below with reference to drawings. These embodiments are not intended to limit the present invention. In the drawings, the same portions are denoted with the same reference signs.

Embodiment 1

Embodiment 1 of the present invention is described first. FIG. 1 is a diagram showing an exemplary configuration of a communication system in Embodiment 1.

As shown in FIG. 1, a communication system 100 according to Embodiment 1 includes a staging network 1 (a first network) and an operational network 2 (a second network).

The operational network 2 is a system environment in which IoT appliances and the like are actually placed in operation. The operational network 2 has hosts 5a, 5b, 5c (second communication devices) and a learning and detection server 8 (a second server device).

The hosts 5a, 5b, 5c are communication devices such as IoT appliances. The multiple hosts 5a, 5b, 5c will be described just as "host 5" when they are collectively referred to without distinction. While the operational network 2 illustrated in FIG. 1 has three hosts 5a, 5b, 5c, there may be at least one host 5.

A learning and detection server 9 of the operational network 2 detects anomalies in the communications of the hosts 5a, 5b, 5c using a model which has learned normal communications. The learning and detection server 9 learns the normal communications and generates a model. The learning and detection server 9 of the operational network 2 has the same functions as those of the learning and detection server 8 (discussed later) of the staging network 1 and they can interchange models with each other. The learning and detection server 9 of the operational network 2 learns the communications of the hosts 5a, 5b, 5c and generates a first model for detecting any anomalous communication of 5a, 5b, 5c for each one of 5a, 5b, 5c, while monitoring the communications of 5a, 5b, 5c using an initial model received from the learning and detection server 8 of the staging network 1.

The staging network 1 is a system environment analogous to the operational network 2 and is used for verification (for testing). The staging network 1 has a host 4t (a first communication device) of the same type as the host 5, a test execution server 3 (a testing device), and the learning and detection server 8 (a first server device) of the staging network 1.

The test execution server 3 performs a communication test by transmitting test communication in a normal state to the host 4t as a tested appliance and receiving communication performed by the host 4t.

The learning and detection server 8 of the staging network 1 learns the test communication by the test execution server 3 and communication originating from the host 4t, and generates an initial model for detecting any anomalous communication of the host 4t. The learning and detection server 8 of the staging network 1 transmits the initial model to the learning and detection server 9 of the operational network 2.

In Embodiment 1, regarding the interchange of models between the learning and detection server 8 in the staging network 1 and the learning and detection server 9 in the operational network 2, transport from the learning and detection server 8 of the staging network 1 to the learning and detection server 9 of the operational network 2 is defined as import and that in the opposite direction is defined as export.

In the communication system 100 according to Embodiment 1, an initial model is previously generated in the staging network 1 using the host 4t of the same type as the host 5. In the communication system 100, when the host 5 as a monitored appliance is actually used in the operational network 2, the previously generated initial model is imported from the learning and detection server 8 of the staging network 1 to the learning and detection server 9 of the operational network 2.

Then, the learning and detection server 9 of the operational network 2 learns the communication of the host 5 and generates the first model for each host 5 while using the initial model for the monitoring of the communication of each communication device. In this manner, the communication system 100 enables simultaneous execution of the detection phase and the learning phase, suppressing an occurrence of a vulnerable period during the learning phase to reduce risk.

[Configuration of Learning and Detection Servers]

Figure 2:
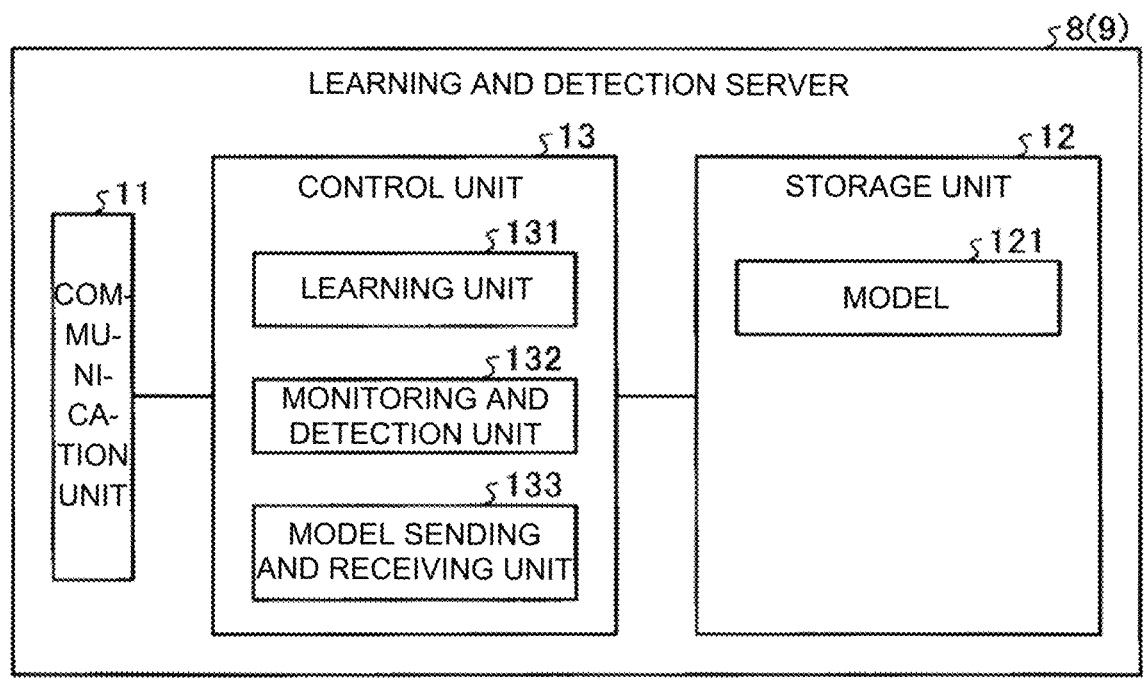
FIG. 2 is a block diagram showing an exemplary configuration of the learning and detection servers shown in FIG. 1.

Configuration of the learning and detection server 8, 9 is described next. FIG. 2 is a block diagram showing an exemplary configuration of the learning and detection server 8, 9 shown in FIG. 1. As shown in FIG. 2, the learning and detection server 8, 9 includes a communication unit 11, a storage unit 12, and a control unit 13.

The communication unit 11 is a communication interface to transmit and receive various kinds of information to and from other devices connected via networks and the like. The communication unit 11 is embodied with a NIC (Network Interface Card) and the like, performing communication between other devices and the control unit 13 (discussed later) over a telecommunication line such as a LAN (Local Area Network) or the internet.

The storage unit 12 is embodied with a semiconductor memory element such as RAM (Random Access Memory), flash memory (Flash Memory) or a storage such as a hard disk or an optical disk, and stores processing programs for operating the learning and detection server 8, 9 and data for use in the execution of the processing programs. The storage unit 12 has a model 121. The model 121 is used for learning the communication of the host 4t, 5 and detecting any anomalous communication of the host 4t, 5. The model 121 includes arithmetic expressions and parameters used for detection of anomalous communications.

The control unit 13 controls the learning and detection server 8, 9 in general. The control unit 13 has internal memory for storing programs defining various processing procedures and required data, and performs various kinds of processing with them. For example, the control unit 13 is an electronic circuit such as CPU (Central Processing Unit) and MPU (Micro Processing Unit). The control unit 13 also functions as various processing components with the actions of the programs. The control unit 13 includes a learning unit 131, a monitoring and detection unit 132, and a model sending and receiving unit 133.

The learning unit 131 captures the communication of the host 4t, 5, learns the communication of the host 4t, 5, and either generates or updates the model. The learning unit 131 stores model parameters for the generated model or model parameters for the updated model in the storage unit 12.

For the learning and detection server 8 of the staging network 1, the learning unit 131 learns test communication by the test execution server 3 and communication originating from the host 4t when a communication test is executed by the test execution server 3, and generates an initial model for detecting any anomalous communication of the host 4t. For the learning and detection server 9 of the operational network 2, the learning unit 131 learns the communication of the host 5 and generates the first model for detecting any anomalous communication of the host 5 for each individual host 5.

The monitoring and detection unit 132 uses the model 121 to monitor the communication of the host 4t, 5 and detect any anomalous communication.

The model sending and receiving unit 133 transmits the model generated by the learning unit 131 to the other learning and detection server 8, 9. The model sending and receiving unit 133 receives the model generated by the other learning and detection server 8, 9.

[Flow of Overall Processing]

Figure 3:
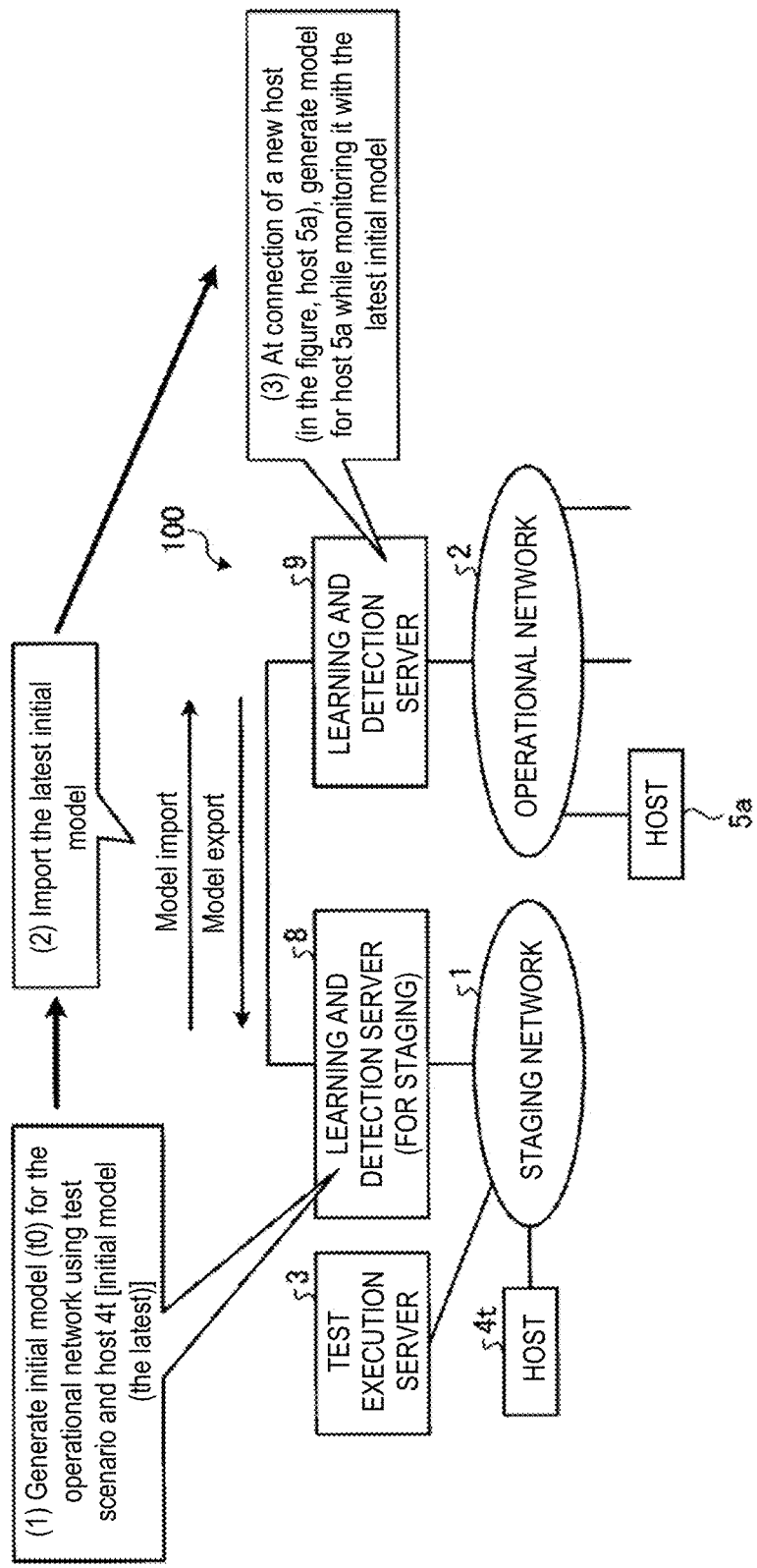
FIG. 3 is a diagram describing a flow of processing in the communication system shown in FIG. 1.

Next, a flow of processing in the communication system 100 is described. FIG. 3 is a diagram describing the flow of processing in the communication system 100 shown in FIG. 1.

First, in the staging network 1, the learning and detection server 8 of the staging network 1 learns the test communication by the test execution server 3 and communication produced by the host 4*t* in response to the communication test to the host 4*t* by the test execution server 3. Specifically, the learning and detection server 8 of the staging network 1 generates the latest initial model t0 for the operational network 2 using a test scenario with the test execution server 3 and the host 4*t* (see (1) in FIG. 3). Subsequently, the learning and detection server 8 of the staging network 1 imports the latest initial model to the learning and detection server 9 of the operational network 2 (see (2) in FIG. 3).

Then, in the operational network 2, the learning and detection server 9 of the operational network 2 generates a model a1 for the host 4*a* (a first model), while monitoring the communication of the host 5*a* using the latest initial model t0 at the time of connection of a new host (in the figure, the host 5*a*) (see (3) in FIG. 3). Then, the learning and detection server 9 of the operational network 2 uses the generated model a1 to monitor the communication of the host 5*a* and detects any anomalous communication.

[Flow of Processing in Staging Network]

Figure 4:
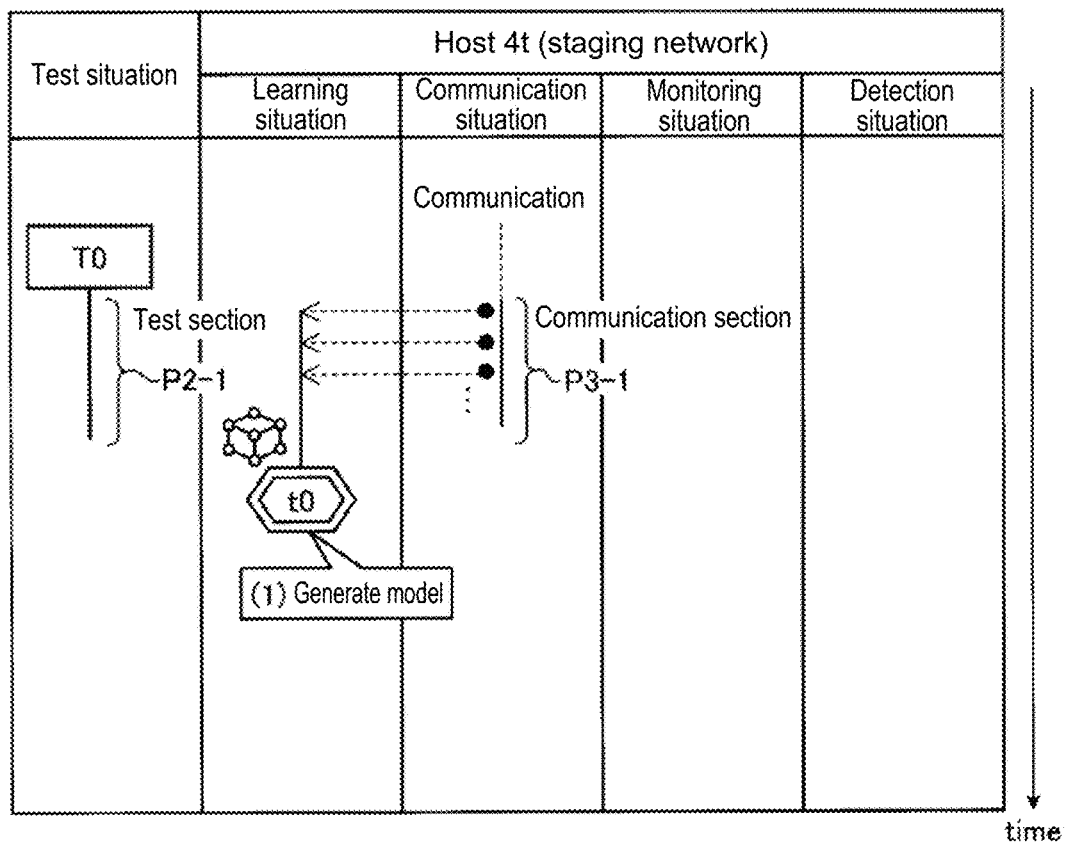
FIG. 4 is a diagram schematically showing the states of communication and learning for a host in the staging network shown in FIG. 1.

Next, a flow of generation processing of the initial model in the staging network 1 is described. FIG. 4 is a diagram schematically showing the states of communication and learning for the host 4*t* in the staging network 1 shown in FIG. 1.

FIG. 4 and subsequent similar diagrams schematically represent communication and monitoring states on the host indicated at the top of the figure, with the vertical axis being the time axis. FIG. 4 and subsequent similar diagrams describe the situations of communication, learning, monitoring and detection, with the situation related to the host being divided along the time axis into: the situation of a test on the host indicated as a lane with a "test situation" label (hereinafter, "test situation lane"), the situation relating to communication indicated as a lane with a "communication situation" label (hereinafter, "communication situation lane"), the situation relating to monitoring indicated as a lane with a "monitoring situation" label (hereinafter, "monitoring situation lane"), and the situation relating to detection indicated as a lane with a "detection situation" label (hereinafter, "detection situation lane"). In FIG. 4 and subsequent diagrams, communication that has been incorporated into a model is represented by an arrow starting at a black circle (e.g., arrows extending to the left from a communication section P3-1 shown in FIG. 4).

As shown in FIG. 4, in the staging network 1, a comprehensive test for exhaustively checking all the functions is typically performed by using the host 4*t*, which is of the same model as the host 5 of the operational network 2, in order to check operations in the operational network 2.

First, in the "test situation lane" in FIG. 4, a testing scenario T0 associated with test communication to the host 4*t* for testing is shown, and the test execution server 3 performs comprehensive test communication to exhaustively check all the functions, with the period in which the testing scenario T0 is performed being a testing period P2-1. Communications that are produced by the host 4*t* during this time are shown in the communication section P3-1 in the "communication situation lane".

Then, the learning and detection server 8 of the staging network 1 generates the initial model t0 as shown in the "learning situation lane" by incorporating the communications in the communication section P3-1 (see (1) in FIG. 4). This initial model t0 will serve as a template for the model in the operational network 2.

[Flow of Processing in the Operational Network]

Figure 5:
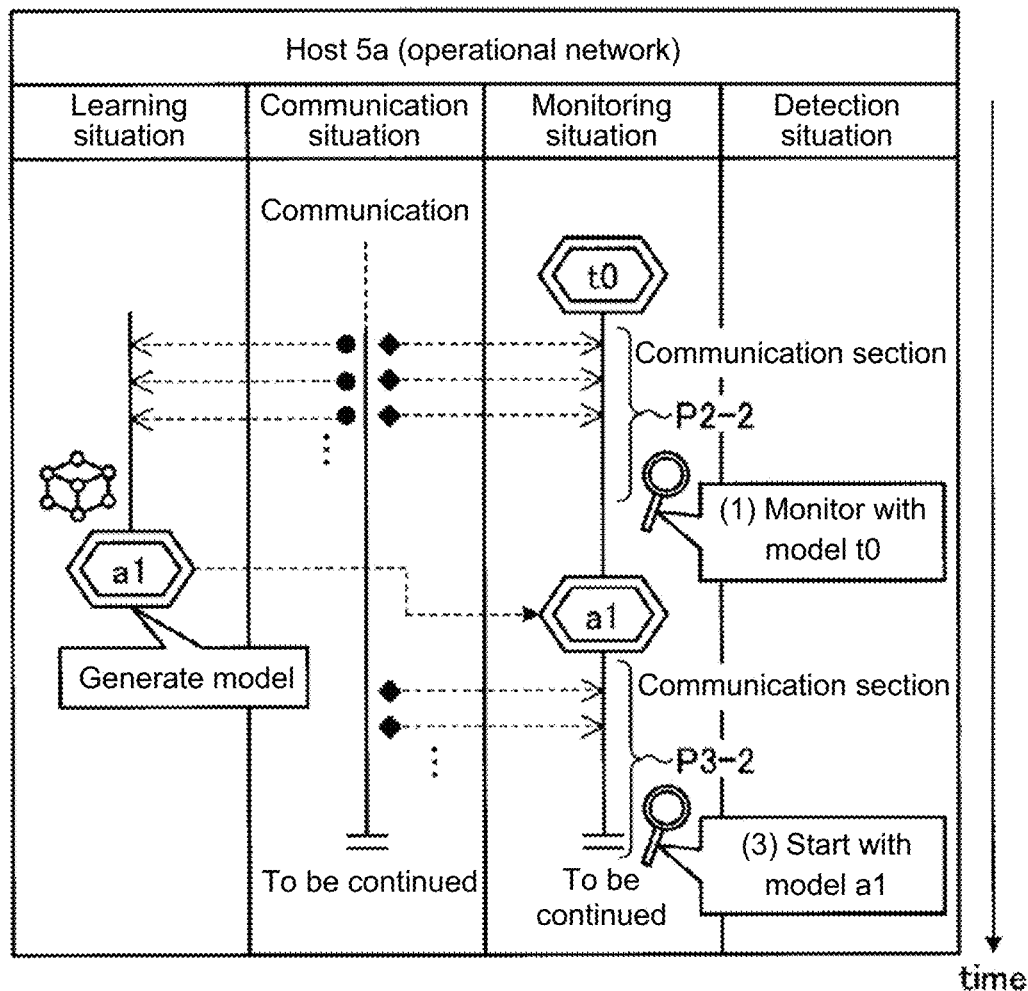
FIG. 5 is a diagram schematically showing the states of communication and monitoring for a host in the operational network shown in FIG. 1.

Next, a flow of monitoring and model generation processing in the operational network 2 is described. FIG. 5 is a diagram schematically showing the states of communication and monitoring for the host 5*a* in the operational network 2 shown in FIG. 1.

As shown in FIG. 5, the learning and detection server 9 of the operational network 2 is monitoring the communication of the host 5*a* during a communication section P2-2 in the "monitoring situation lane" using the initial model t0 generated in FIG. 4 (see (1) in FIG. 5). The transport of this initial model t0 is carried out by importing it from the staging network 1 to the operational network 2 through the communication between the learning and detection server 8 of the staging network 1 and the learning and detection server 9 of the operational network 2.

As a result, in FIG. 5, the learning and detection server 9 of the operational network 2 generates the model a1 by actually incorporating the communication between itself and the host 5*a* in the operational network 2, while monitoring the communication of the host 5*a* in the communication section P2-2 using the initial model t0 (see (2) in FIG. 5). In a subsequent communication period P3-2 onward, the learning and detection server 9 of the operational network 2 uses the generated model a1 to monitor the communication of the host 5*a* (see (3) in FIG. 5).

[Processing Procedure of Communication Processing]

Figure 6:
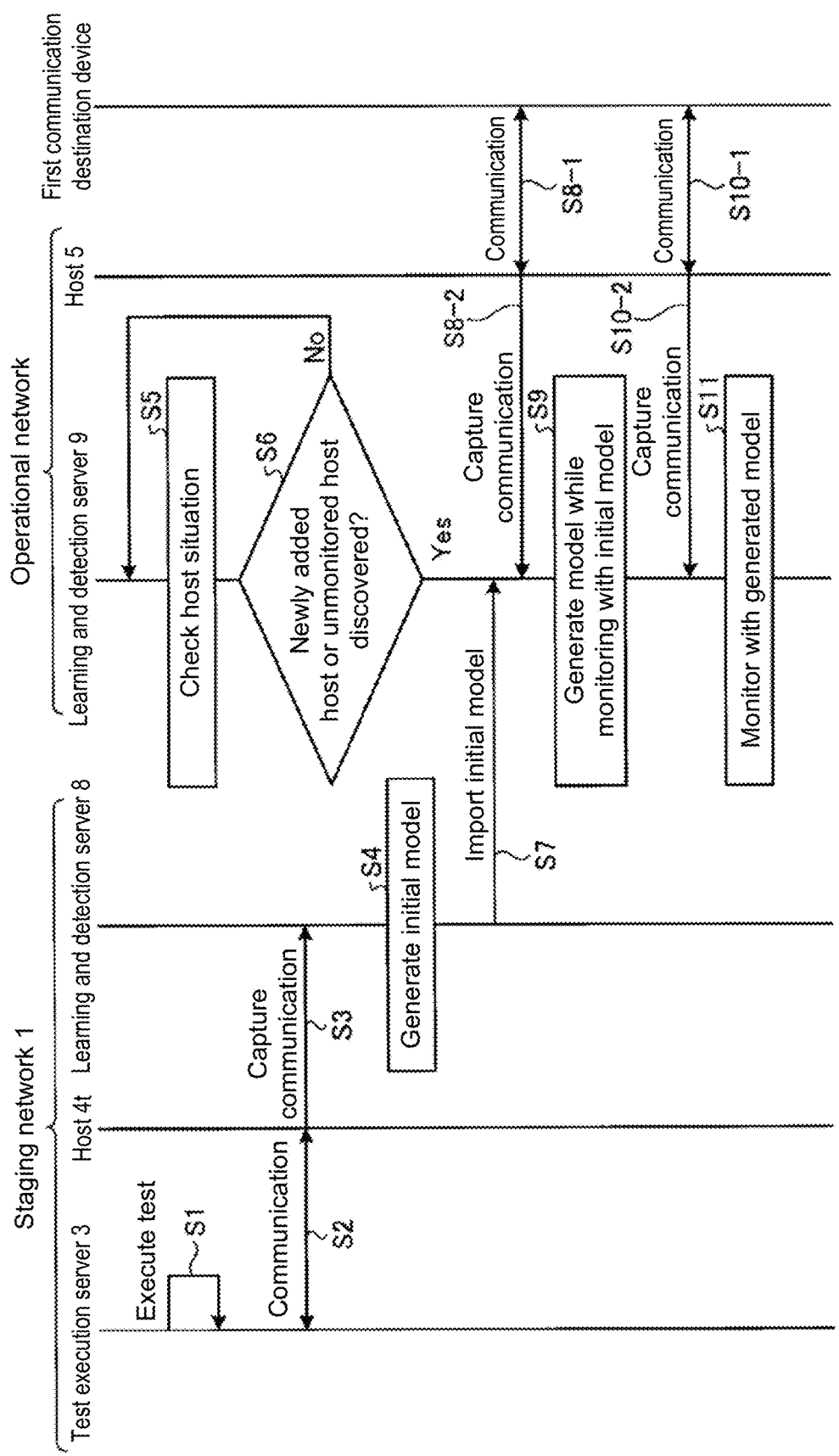
FIG. 6 is a sequence chart showing a processing procedure of communication processing according to Embodiment 1.

FIG. 6 describes a flow of processing in the communication system 100. FIG. 6 is a sequence chart showing a processing procedure of communication processing according to Embodiment 1.

First, in the staging network 1, the learning and detection server 8 of the staging network 1 captures (step S3) the communication between the host 4*t* and the test execution server 3 (step S2) which has been produced in response to the test communication by the test execution server 3 (step S1), and learns the communication of the host 4*t* and generates the initial model (step S4).

In the operational network 2, the learning and detection server 9 of the operational network 2 checks the host situation (step S5), and determines whether a newly added host or an unmonitored host has been discovered (step S6). If it determines that a newly added host or an unmonitored host has not been discovered (step S6: No), the learning and detection server 9 returns to step S5 to continue the checking of the host situation.

In contrast, a case where the learning and detection server 9 of the operational network 2 determines that a newly added host or an unmonitored host has been discovered (step S6: Yes) is described. In this case, the learning and detection server 9 of the operational network 2 receives an import of the initial model from the learning and detection server 8 of the staging network 1 (step S7), and while using this initial model to capture (step S8-2) and monitor the communication between the new host 5 and other device (e.g., the first communication destination device) (step S8-1), it generates the model for the host 5 (step S9).

After generating the model for the host 5, the learning and detection server 9 of the operational network 2 uses the generated model for the host 5 to capture (step S10-2) the communication between the host 5 and the first communication destination device (step S10-1), and monitors the communication of the host 5 (step S11), and performs detection of anomalous communication.

Effects of Embodiment 1

Figure 7:
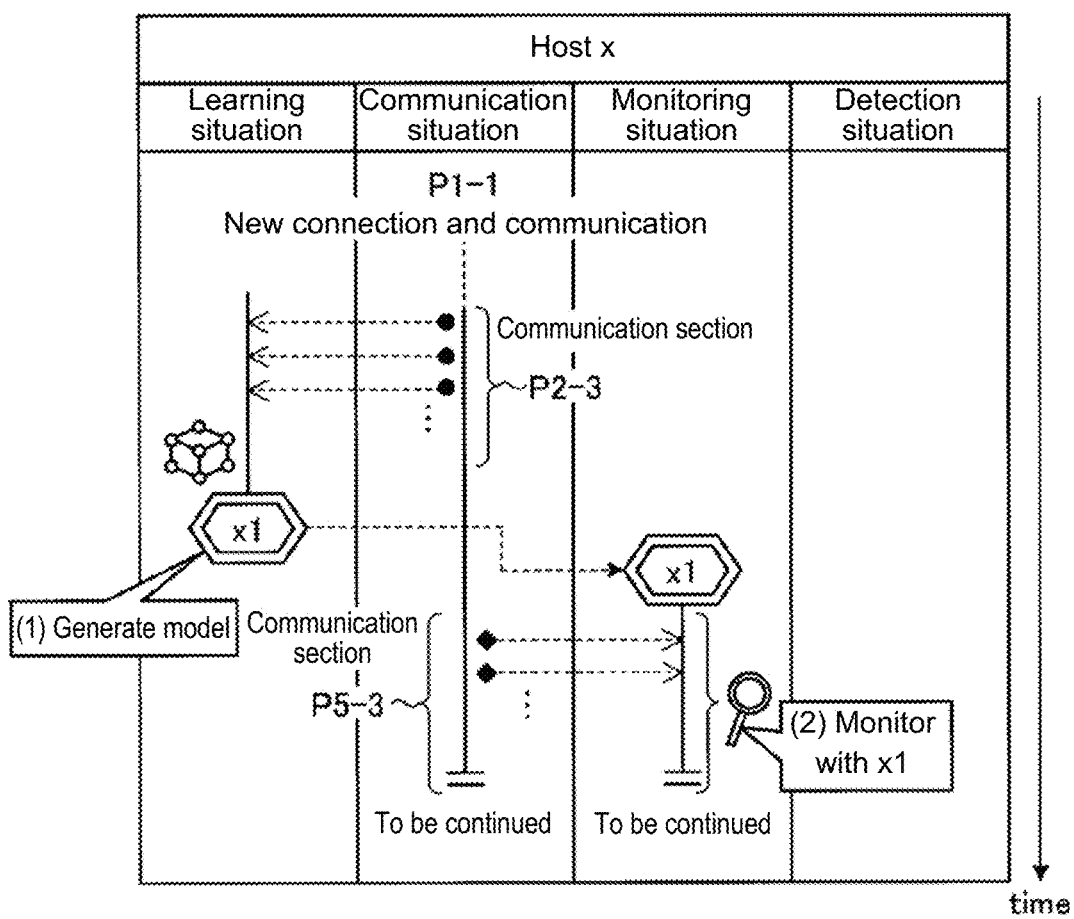
FIG. 7 is a diagram schematically showing the states of communication and monitoring for a host at a learning and detection server according to a conventional technique.

Here, a conventional technique is described. FIG. 7 is a diagram schematically showing communication and monitoring states for a host x at a learning and detection server according to a conventional technique. As shown in FIG. 7, for the host x which has started new connection and communication, the conventional learning and detection server incorporates the communication of the host x in a communication section P2-3 and generates a model x1, as shown in the "learning situation lane" (see (1) FIG. 7). After that, the conventional learning and detection server uses the model x1 to monitor the communication during a communication section P5-3 in the "communication situation lane (see (2) in FIG. 7) as shown in the "monitoring situation lane", thereby detecting whether there is anomalous communication or not. Thus, the conventional technique is not monitoring communication during learning and carries out monitoring of communication after the learning ended, hence having the problem of creating a vulnerable period during the learning phase.

By contrast, in Embodiment 1 of the present invention, test communication to the host 4t, which is the same type as the host 5 of the operational network 2, is learned beforehand and the initial model for the host 4t is generated in the staging network 1. In Embodiment 1, this initial model is imported to the operational network 2, and while also monitoring the communication of the host 5a using the initial model t0, the learning and detection server 9 of the operational network 2 learns the communication of the host 5a and generates the model a1 corresponding to the host 5a. Thus, the learning and detection server 9 of the operational network 2 carries out monitoring also during the learning phase, so that occurrence of a vulnerable period during the learning phase can be suppressed and the learning phase when detecting anomalous communication can be executed more securely.

Embodiment 2

Embodiment 2 is described next. Embodiment 2 shows a method for further enhancing the accuracy of the initial model described in Embodiment 1. The communication system according to Embodiment 2 has the same configuration as the communication system 100 according to Embodiment 1.

[Flow of Overall Process]

Figure 8:
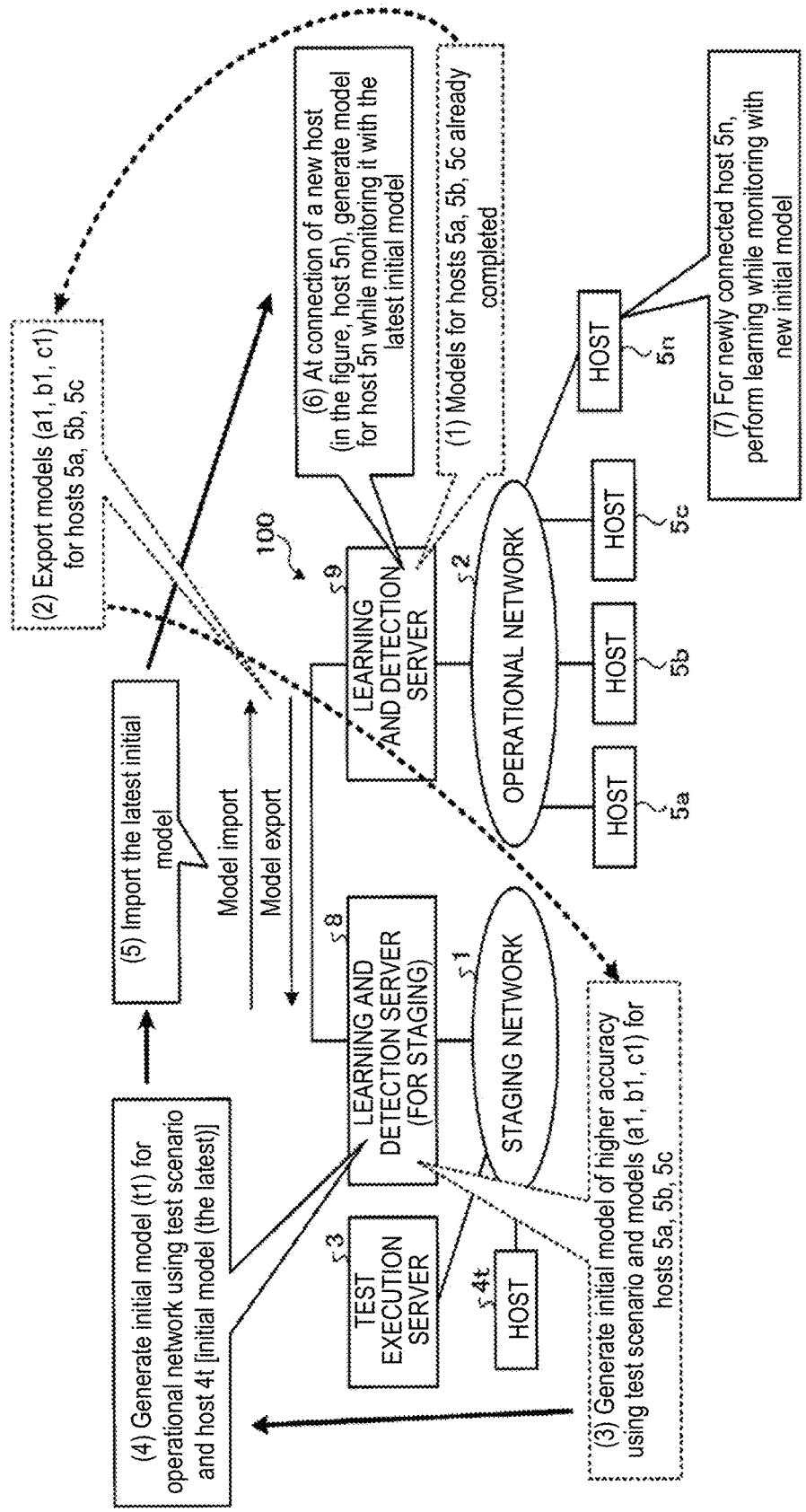
FIG. 8 is a diagram describing a flow of communication processing in Embodiment 2.

Next, the flow of communication processing in Embodiment 2 is described. FIG. 8 is a diagram describing a flow of communication processing in Embodiment 2. FIG. 8 describes processing after the learning and detection server 9 of the operational network 2 has monitored the communications of the hosts 5a, 5b, 5c using the generated model a1. That is, at the learning and detection server 9 of the operational network 2, the models for the hosts 5a, 5b, 5c are already completed (see (1) in FIG. 8). In this status, the learning and detection server 9 of the operational network 2 exports the models (a1, b1, c1) for the hosts 5a, 5b, 5c to the learning and detection server 8 of the staging network 1 (see (2) in FIG. 8).

The learning and detection server 8 of the staging network 1 generates an initial model of higher accuracy by using the test scenario with the test execution server 3 and the models (a1, b1, c1) for the hosts 5a, 5b, 5c (see (3) in FIG. 8). In other words, the learning and detection server 8 of the staging network 1 generates an initial model (t1) for the operational network 2 and updates the initial model using the test scenario with the test execution server 3 and the host 4t (see (4) in FIG. 8). Then, the learning and detection server 8 of the staging network 1 imports the generated latest initial model t1 to the learning and detection server 9 of the operational network 2 (see (5) in FIG. 8).

Subsequently, when a new host (in FIG. 8, a host 5n) is connected, the learning and detection server 9 of the operational network 2 generates a model for the host 5n while monitoring the communication of the host 5n with the latest initial model t1 (see (6) in FIG. 8). That is, the learning and detection server 9 of the operational network 2 learns while performing monitoring using a new initial model for the newly connected host 5n (see (7) in FIG. 8).

In this manner, in Embodiment 2, the learning and detection server 8 of the staging network 1 updates the initial model using the model for each host 5 exported from the learning and detection server 9 of the operational network 2, and imports the latest initial model to the learning and detection server 9 of the operational network 2.

As also described in Embodiment 1, in a case where the host 5 to be introduced into the operational network 2 is an appliance of the same type as the host 4t of the staging network 1, the initial model t0 generated at the learning and detection server 8 of the staging network 1 can be imported to the learning and detection server 9 of the operational network 2 when the host 5 is introduced into the operational network 2, thereby enabling communication to be monitored also in the learning phase using this initial model t0.

Figure 9:
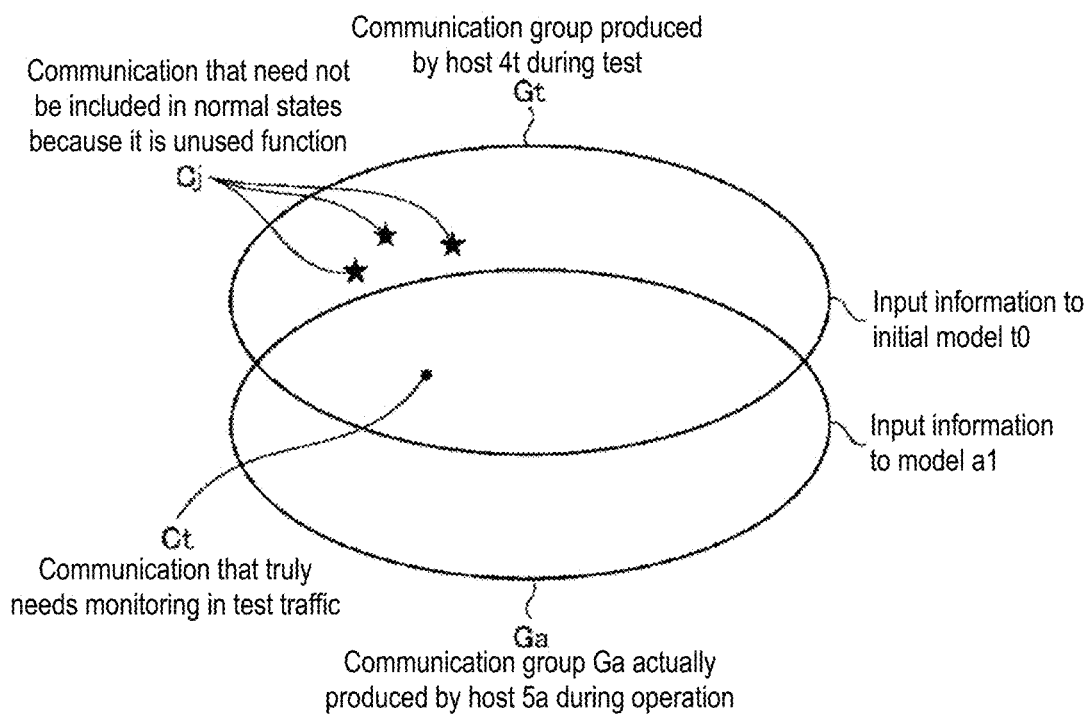
FIG. 9 is a diagram showing the relationship between communications learned by models and the communication of a host.

However, since Embodiment 1 generates the initial model using all kinds of communication corresponding to an exhaustive test communication that covers all of the functions of the host 4t, communications that are not actually used in the operational network 2 are also incorporated as learning. FIG. 9 is a diagram showing the relationship between communications learned by models and the communication of the host.

Specifically, test communication performed by the test execution server 3 and a communication group Gt that is produced by the host 4t during the test shown in FIG. 9 serve as input information to the initial model t0. Among the communications in the communication group Gt, communication Ct is communication that is included in a communication group Ga which is actually produced by the host 5a during operation and that truly needs monitoring in the test traffic.

In contrast, communication Cj is communication that is not included in the communication group Ga and that need not be included in the normal states because it is an unused function not used in operation. This communication Cj is communication that will be identified as normal when monitored with the initial model but would pose a risk of overlook if a cyberattack is performed via communication similar to the communication Cj. In other words, since the communication Cj is an unused function in the operational network 2, it is communication that should not be included in the normal states also at the time of generating the model for the staging network 1.

Figure 10:
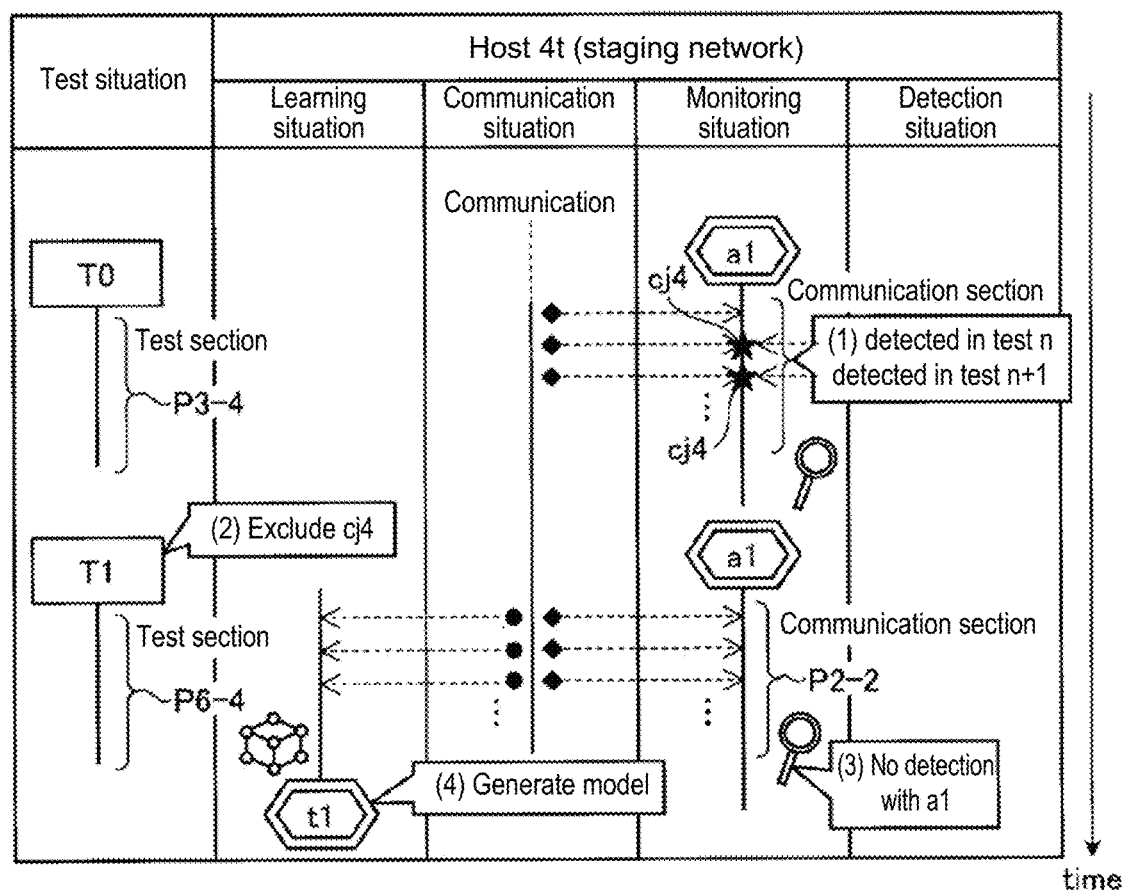
FIG. 10 is a diagram schematically showing the states of communication, learning and monitoring for a host in the staging network in Embodiment 2.

Thus, when the initial model is generated for the second time and beyond at the learning and detection server 8 of the staging network 1 in Embodiment 2, the communication Cj is excluded from learning of the initial model t1 to thereby increase the accuracy of the initial model. Specifically, referring to FIG. 10, generation of the initial model t1 in the staging network 1 is described. FIG. 10 is a diagram schematically showing the states of communication, learning and monitoring for the host 4*t* in the staging network 1 in Embodiment 2.

FIG. 10 shows a process up to when the learning and detection server 8 of the staging network 1 generates a new initial model t1 using the model a1 for the host 5*a* which was generated by the learning and detection server 9 of the operational network 2. First, as shown in the "monitoring situation lane" of FIG. 10, the model a1 is a model exported from the learning and detection server 9 of the operational network 2 to the learning and detection server 8 of the staging network 1 and is used for monitoring of communications in the staging network 1.

Then, in response to the execution of the testing scenario T0, the learning and detection server 8 of the staging network 1 detects communication that is extracted by the use of the model a1, namely, communication Cj4 which is identified as being different from normal by the model a1, among the communications of the host 4*t* during a test section P3-4. In the example of FIG. 10, the learning and detection server 8 of the staging network 1 can determine by which test the communication Cj4 has been produced, such as "detected in test n" and "detected in test n+1" in test communication, by cooperating with the test execution server 3 as shown in the "detection situation lane" (see (1) in FIG. 10).

Accordingly, the learning and detection server 8 of the staging network 1 can extract the communication Cj4, which is detected as anomalous communication with the model a1, by monitoring the communication of the host 4*t* with the model a1.

Subsequently, the test execution server 3 creates a testing scenario T1 by excluding the test that produces the communication Cj4 from the testing scenario T0 (see (2) in FIG. 10). Then, the learning and detection server 8 of the staging network 1 generates the initial model t1 from the communication of the host 4*t* during a test section P6-4 by executing the testing scenario T1, as shown in the "test situation lane" (see (4) in FIG. 10). For the communication of the host 4*t* during the communication section P2-2 corresponding to the test section P6-4, there is no detection by the model a1 (see (3) in FIG. 10). Thus, the learning and detection server 8 of the staging network 1 can generate the initial model t1 without the unnecessary communication Cj4 being incorporated into learning and with higher accuracy than the initial model t0.

Figure 11:
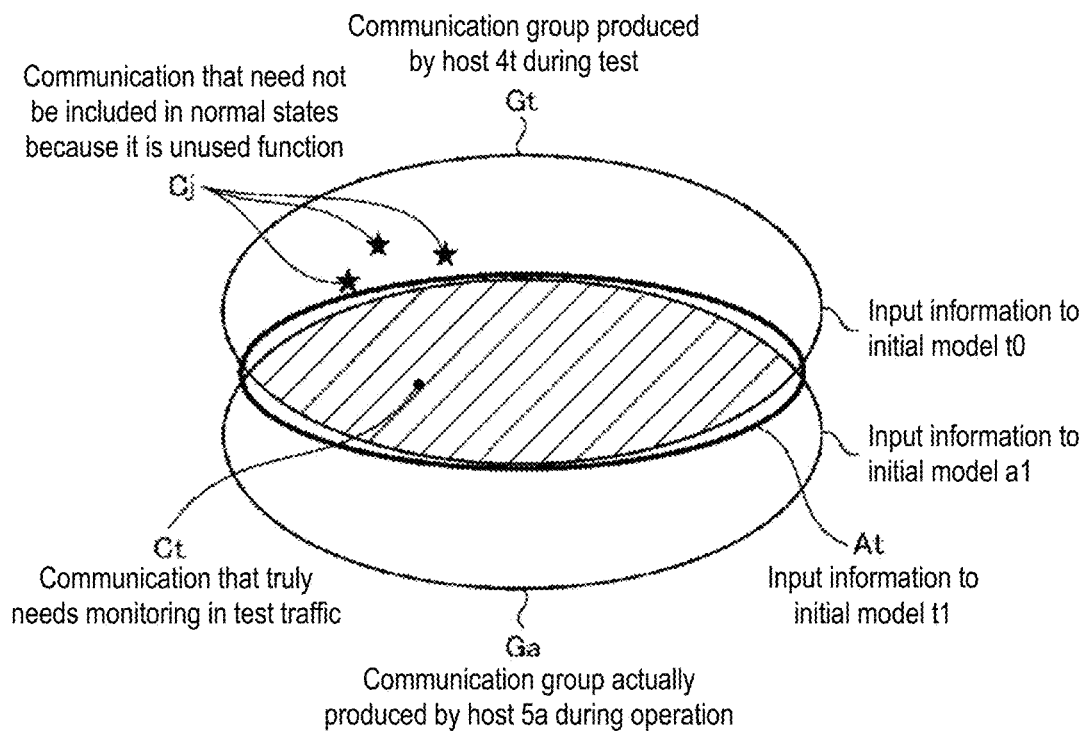
FIG. 11 is a diagram showing the relationship between the communications learned by models and the communications of a host.

FIG. 11 is a diagram showing the relationship between the communications learned by models and the communications of the host. As shown in FIG. 11, the initial model t1 is a model that is generated from communications in an area At in FIG. 11. That is, the initial model t1 is generated using, as input, communications in the area At which include only communication Ct that truly needs monitoring and excludes the unnecessary communication Cj, out of the communication group Gt produced by the host 4*t*.

The learning and detection server 8 of the staging network 1 imports the latest initial model t1 to the learning and detection server 9 of the operational network 2, and the model t1 is used as the model for the newly connected host 5*n* in the operational network 2, so that the model can be generated securely while performing monitoring more suitably in the operational network 2.

Figure 12:
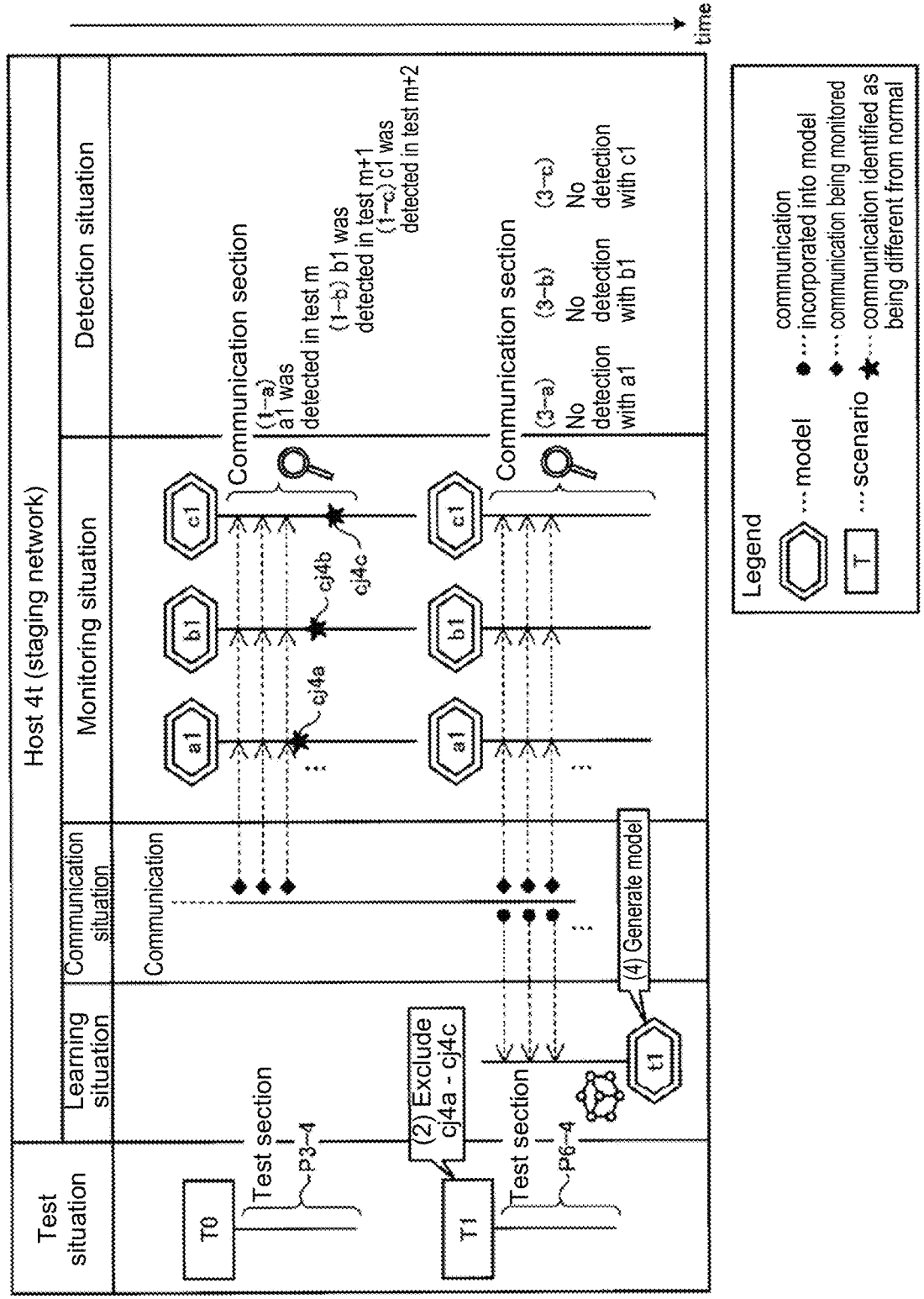
FIG. 12 is a diagram schematically showing the states of communication, learning and monitoring for a host in the staging network in Embodiment 2.

While FIG. 10 illustrates a case of updating the initial model with the model a1 for the host 5*a*, the present invention is not limited thereto, of course. FIG. 12 is a diagram schematically showing the states of communication, learning and monitoring for the host 4*t* in the staging network 1 in Embodiment 2.

In the staging network 1, when the models a1, b1, c1 generated by the respective ones of the three hosts 5*a*, 5*b*, 5*c* are exported as in FIG. 12, the learning and detection server 8 can use the three models a1, b1, c1 to perform similar processing to that in FIG. 10 and generate the initial model t1 with more selectively picked features of the hosts.

For example, with execution of the testing scenario T0, the learning and detection server 8 of the staging network 1 detects communications Cj4*a*, Cj4*b*, Cj4*c*, which are detected using the models a1, b1, c1, among the communications of the host 4*t* during the test section P3-4. In the example of FIG. 12, the learning and detection server 8 of the staging network 1 can determine that the model a1 detected the communication CJ4*a* in test m, the model b1 detected the communication Cj4*b* in test m+1, and the model c1 detected the communication Cj4*c* in test m+2, as shown in the "detection situation lane" (see (1-*a*), (1-*b*), (1-*c*) in FIG. 12).

Subsequently, the test execution server 3 creates a testing scenario T1 by excluding the tests that produce the communications Cj4*a* to Cj4*c* from the testing scenario T0 (see (2) in FIG. 12). Then, the learning and detection server 8 of the staging network 1 generates the initial model t1 from the communication of the host 4*t* during a test section P6-4 by executing the testing scenario T1, as shown in the "test situation lane". The learning and detection server 8 of the staging network 1 thereby can generate the initial model t1 for which the unnecessary communications Cj4*a*, Cj4*b*, Cj4*c* have not been incorporated into learning and which is of higher accuracy than the initial model t0 (see (4) in FIG. 12). For the communications of the host 4*t* during the test section P6-4, there is no detection by the models a1, b1, c1 (see (3-*a*, 3-*b*, 3-*c*) in FIG. 12).

[Processing Procedure of Communication Processing]

Figure 13:
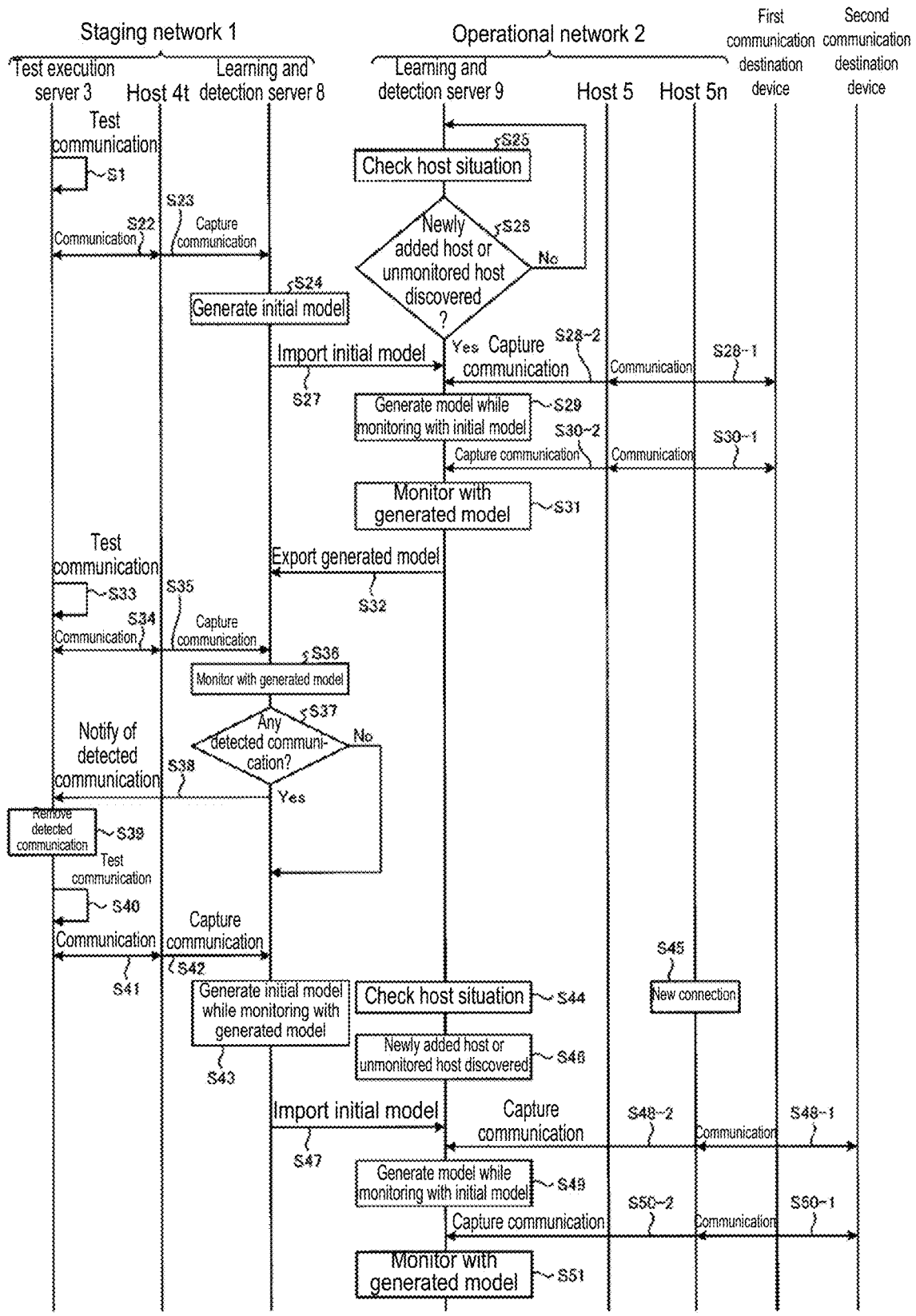
FIG. 13 is a sequence chart showing a processing procedure of communication processing according to Embodiment 2.

Next, the flow of communication processing in Embodiment 2 is described. FIG. 13 is a sequence chart showing a processing procedure of communication processing according to Embodiment 2.

The steps S21 through S31 shown in FIG. 13 have the same processing actions as the steps S1 through S11 shown in FIG. 6. Then, the learning and detection server 9 of the operational network 2 exports the generated model to the learning and detection server 8 of the staging network 1 (step S32).

Subsequently, in the staging network 1, the learning and detection server 8 captures (step S35) the communication between the host 4*t* and the test execution server 3 (step S34) which has been produced due to the test communication to the host 4*t* performed by the test execution server 3 (step S33), and monitors the communication of the host 4*t* using the model generated by the learning and detection server 9 of the operational network 2 (step S36).

Then, the learning and detection server 8 of the staging network 1 determines whether there is any communication that has been detected with the model generated by the learning and detection server 9 of the operational network 2 (step S37). If it determines that there is communication that has been detected by the model generated by the learning and detection server 9 of the operational network 2 (step S37: Yes), the learning and detection server 8 of the staging network 1 notifies the test execution server 3 of the detected communication (step S38).

The test execution server 3 excludes the communication that was detected by the model generated by the learning and detection server 9 of the operational network 2 from test communication (step S39), and performs the test communication (step S40). In response, the learning and detection server 8 of the staging network 1 captures (step S42) the communication between the host 4t and the test execution server 3 (step S41). The learning and detection server 8 of the staging network 1 learns the communication of the host 4t and generates the latest initial model, while monitoring the communication of the host 4t with the model generated by the learning and detection server 9 of the operational network 2 (step S43).

In the operational network 2, the learning and detection server 9 checks the host situation (step S44), and determines whether a newly added host or an unmonitored host has been discovered (step S46). If it determines that a newly added host or an unmonitored host has not been discovered, the learning and detection server 9 returns to step S44 to continue the checking of the host situation.

In contrast, a case where the learning and detection server 9 of the operational network 2 determines that a newly added host or an unmonitored host has been discovered due to a new connection of the host 5n (step S45) is described. In this case, the learning and detection server 9 of the operational network 2 receives an import of the latest initial model from the learning and detection server 8 of the staging network 1 (step S47), and while using this initial model to capture (step S48-2) and monitor the communication between the new host 5n and other device (e.g., the second communication destination device) (step S48-1), it generates a model for the host 5n (step S49). Subsequently, the learning and detection server 9 of the operational network 2 uses the generated model for the host 5n to capture (step S50-2) the communication between the host 5n and the second communication destination device, for example (step S50-1), monitors the communication of the host 5n (step S51), and performs detection of anomalous communication.

Effects of Embodiment 2

As described above, in Embodiment 2, the learning and detection server 9 of the operational network 2 exports the model for the host 5 (the first model) generated at the learning and detection server 9 to the learning and detection server 8 of the staging network 1. Then, the test execution server 3 performs a first communication test. During the test, the learning and detection server 8 of the staging network 1 uses the first model to detect anomalous communication from the test communication and from the communication performed by the host 4t in the first communication test. Then, the test execution server 3 performs a second communication test excluding the test communication that was detected as anomalous communication by the learning and detection server 8 of the staging network 1. Then, the learning and detection server 8 of the staging network 1 learns the test communication and the communication of the host 4t in the second communication test, generates a new initial model, and imports the new initial model to the learning and detection server 9 of the operational network 2.

Thus, Embodiment 2 can improve the accuracy of the initial model by excluding communications that need not be included in the normal states because they are unused functions not used in operation from learning of the initial model.

Embodiment 3

Embodiment 3 is described next. Embodiment 3 shows a method for learning and detecting over-detected communication while preventing prolongation of the learning phase at the learning and detection server 9 of the operational network 2, even upon an occurrence of a normal over-detected communication that was detected as anomalous in the course of monitoring and detection process in the operational network 2. The communication system according to Embodiment 3 has the same configuration as the communication system 100 according to Embodiment 1. Embodiment 3 is described by taking a case where the hosts 5d, 5e are connected as hosts in the operational network 2 as an example.

Embodiments 1 and 2 showed a case where the communication of the host 5 in the operational network 2 is based on a subset of communications that are produced by the host 4t in response to a comprehensive test for exhaustively checking all the functions of the host 4t. However, depending on the operational network 2, communication specific to that operational network 2 can be produced. For example, this can be the case when a monitoring system already exists in the operational network 2 and uncommon communication due to an uncommon usage of a function, such as communication for health check or maintenance, is produced with respect to a newly connected host 5.

Figure 14:
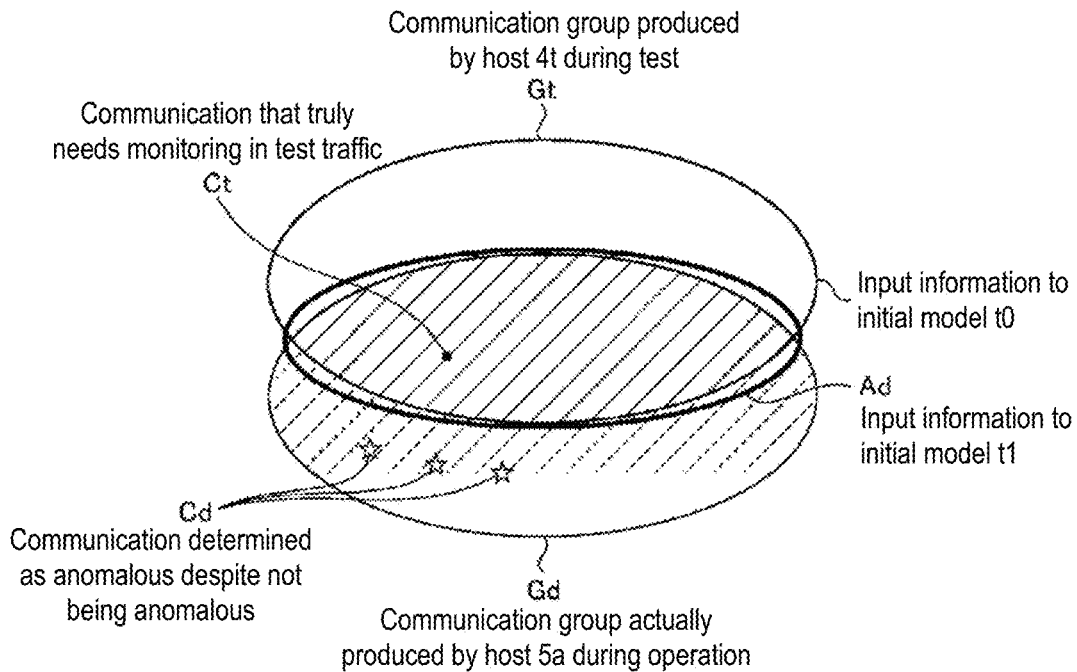
FIG. 14 is a diagram showing the relationship between communications learned by models and the communication of a host.
Figure 15:
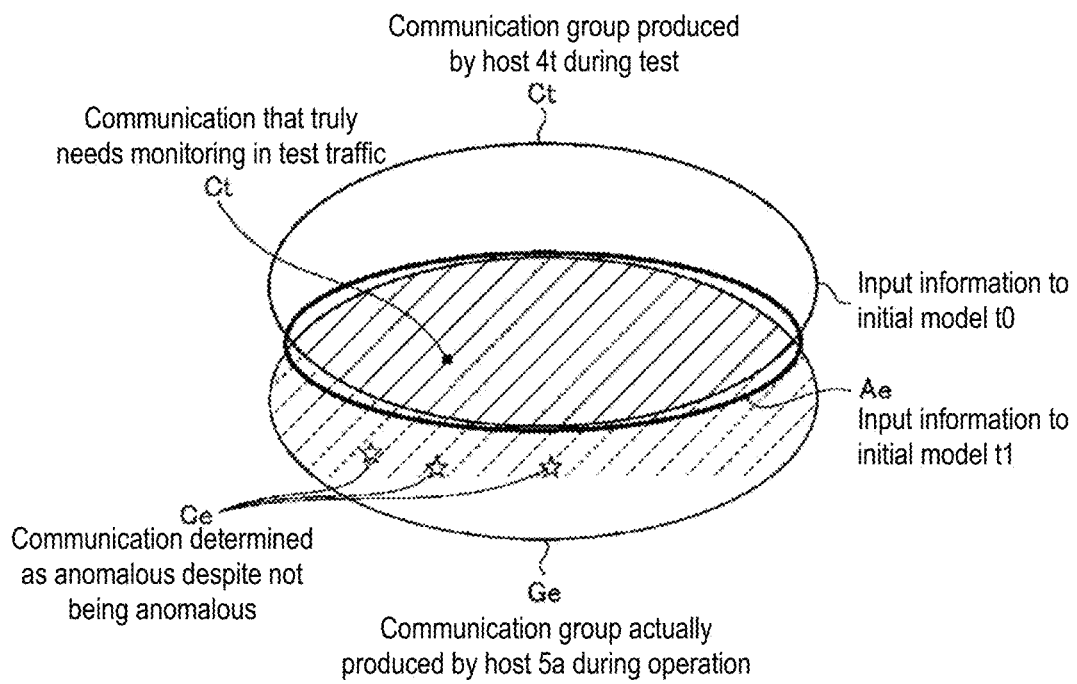
FIG. 15 is a diagram showing the relationship between communications learned by models and the communication of a host.

Such a situation is described by taking a case where a host 4d and a host 4e are newly connected to the operational network 2 as an example. FIG. 14 is a diagram showing the relationship between communications learned by models and the communication of the host 4d. FIG. 15 is a diagram showing the relationship between communications learned by models and the communication of the host 4e.

FIGS. 14 and 15 assume a case where the learning and detection server 9 of the operational network 2 is performing monitoring using the initial model t1 imported from the learning and detection server 8 of the staging network 1. Area Ad, Ae is a set of communications that have been learned by the latest initial model t1 imported from the learning and detection server 8 of the staging network 1, and represent communication information that has been input to the initial model t1. As mentioned previously, depending on the operational network 2, communication specific to that operational network 2 can be produced. For example, the communication Cd, Ce in communication group Gd, Ge, which is actually produced by the host 5d, 5e during operation, is communication that is produced when the host 4d and the host 4e are used in a specific manner during operation. However, these communications Cd, Ce are not included in the input information to the initial model t1.

As a result, when the learning and detection server 9 performs monitoring and detection using the initial model t1, the communication Cd, Ce will be detected as communication that is determined to be anomalous even though they are not. The communication Cd, Ce is communication that should really not be detected as anomalous. In the following, such communication Cd, Ce will be referred to as over-detected communication.

Here, over-detected communication is communication that should be learned as a normal state. Specifically, the learning and detection server 9 can suppress subsequent over-detected communications by incorporating over-detected communication with the host 5d into the model for the host 5d and incorporating and learning over-detected communication with the host 5e into the model for the host 5e.

However, in a case where the learning and detection server 9 of the operational network 2 incorporates over-detected communication into the model for each host 5 and learns it, there will be a certain time lag before it is incorporated into the model. This is Because a Certain Analysis Device Analyzes the detected communication and determines whether it is an anomaly or over-detected communication, and after it is found to be over-detected communication, the communication is incorporated into learning. The occurrence of this time lag leads to the prolongation of the learning phase. In the following, the time lag before the completion of the learning phase will be called a "delay problem". This delay problem has the influence of delayed completion of the model, that is, delay in the start of monitoring with a newer model. Accordingly, Embodiment 3 proposes a method that does not cause the delay problem and that also suppresses over-detected communications.

[Flow of Processing in Operational Network]

Figure 16:
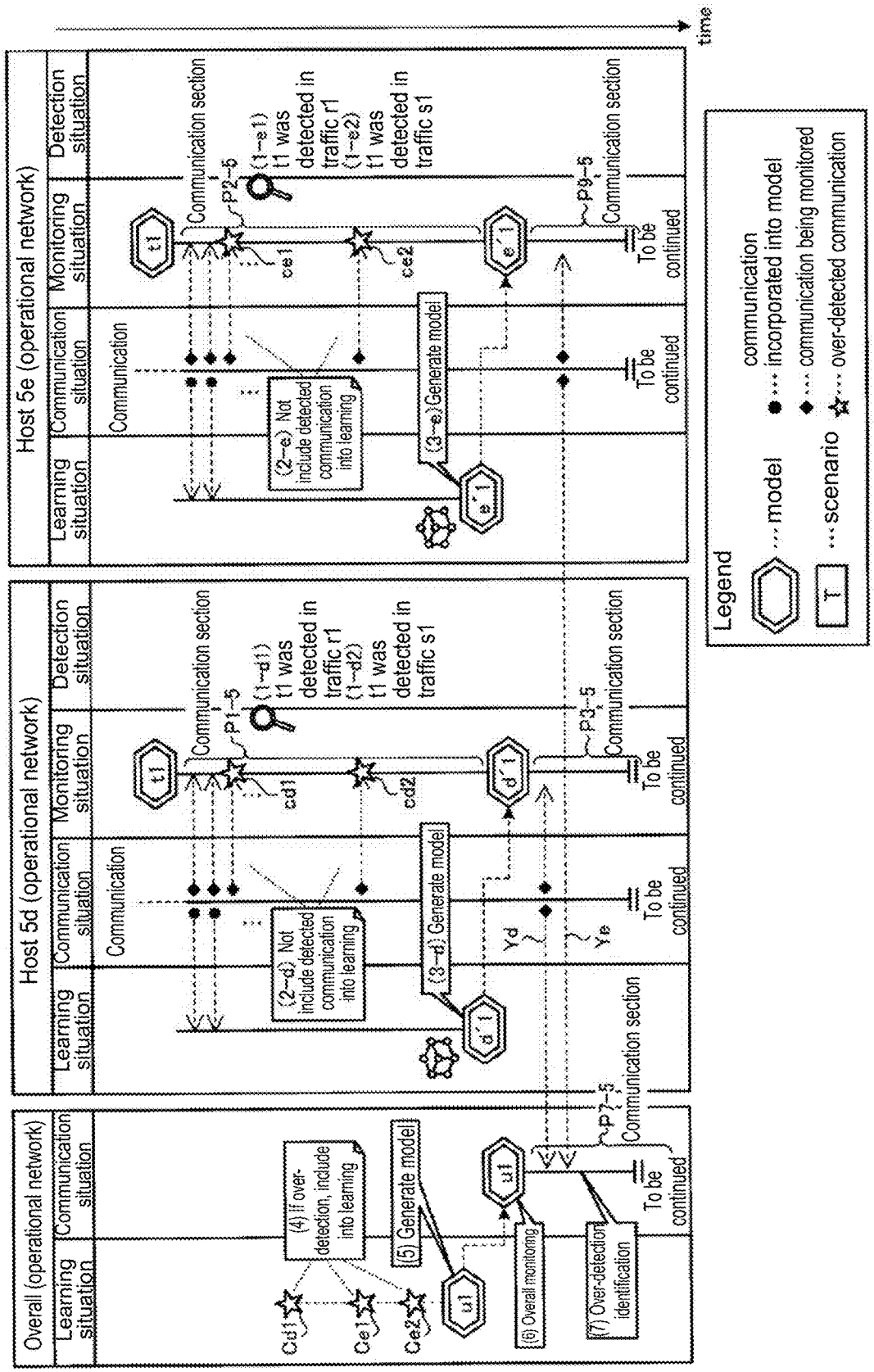
FIG. 16 is a diagram schematically showing the states of communication, learning and monitoring for hosts in the operational network in Embodiment 3.

FIG. 16 is a diagram schematically showing the states of communication, learning and monitoring for the hosts 5d, 5e in the operational network 2 in Embodiment 3. In the schematic diagram of FIG. 16, the left hand box shows the learning situation and the monitoring situation for the overall operational network at the learning and detection server 9 of the operational network 2, the middle box shows the learning situation and the monitoring situation for the host 5d at the learning and detection server 9 of the operational network 2, and the right hand box shows the learning situation and the monitoring situation for the host 5e at the learning and detection server 9 of the operational network 2.

As shown in the middle and right hand boxes of FIG. 16, the learning and detection server 9 of the operational network 2 incorporates the communications of the hosts 5d, 5e to generate models d'1, e'1 while monitoring the communications of the hosts 5d, 5e during communication sections P1-5, P2-5 using the latest initial model t1 generated in the staging network 1. In doing so, in the communication sections P1-5, P2-5, communications Cd1, Cd2, Ce1, Ce2 are detected as being anomalous by the initial model t1. In the example of FIG. 16, as shown in "detection situation lane", the learning and detection server 9 of the operational network 2 is assumed to be able to determine that communications Cd1, Ce1 were "detected in traffic r1" by the initial model t1, communication Cd2 was "detected in traffic s1" by the initial model t1, and communication Ce2 was "detected in traffic s6" by the initial model t1 (see (1-d1), (1-d2), (1-e1), (1-e2) in FIG. 16).

As shown in the middle and right hand boxes, the learning and detection server 9 of the operational network 2 generates the models for the hosts 5d, 5e (see (3-d), (3-e) in FIG. 16) without including the communications Cd1, Cd2, Ce1, Ce2 detected by the initial model t1 into learning (see (2-d), (2-e) in FIG. 16) among the communications of 5d, 5e. That is, the learning and detection server 9 of the operational network 2 learns communications that exclude communications that were detected as anomalous communication with the initial model t1 from the communications of 5d, 5e, and generates the model d'1 for the host 5d (the first model) and the model e'1 for the host 5e (the first model). Then, the learning and detection server 9 of the operational network 2 monitors the hosts 5d, 5e using the generated model d'1 and model e'1 for the host 5e.

Further, as shown in the left hand box, if communication detected as anomalous communication by the initial model t1 is over-detected communication, the learning and detection server 9 of the operational network 2 learns the communication Cd, Ce representing this over-detected communication and generates a model u1 (the second model) for detecting anomalous communications other than over-detected communication, with respect to the overall operational network 2 (see (4) and (5) in FIG. 16).

Then, for the overall operational network 2, the learning and detection server 9 of the operational network 2 uses the model u1 to monitor communications in the overall operational network 2 (see (6) in FIG. 16). Thus, in the example shown in FIG. 16, the learning and detection server 9 of the operational network 2 finally performs monitoring with the model u1 for the overall operational network 2 (see a communication section P7-5), monitoring with the model d'1 for the host 5d (see a communication section P3-5), and monitoring with the model e'1 for the host 5e (see a communication section P9-5).

For specific monitoring processing, the learning and detection server 9 of the operational network 2 monitors the communications of the hosts 5d, 5e with the model u1, which has learned over-detected communication (see arrows Yd, Ye in FIG. 16), and with the model d'1 and model e'1 generated with the hosts 5d, 5e, respectively.

Then, if there is any over-detected communication in the communications of the hosts 5d, 5e, it would be detected by the model d'1 or the model e'1 but not by the model u1. Accordingly, from such difference in detection situation between the models, the learning and detection server 9 of the operational network 2 can determine whether the detected event is over-detected communication or not, that is, whether it may be determined as normal or not (see (7) in FIG. 16).

That is, the learning and detection server 9 of the operational network 2 identifies communication that was detected as anomalous communication with the model d'1 or the model e'1 and that was not detected as anomalous communication with the model u1, as over-detected communication. Meanwhile, the learning and detection server 9 of the operational network 2 outputs communication that was detected as anomalous communication with the model d'1 or the model e'1 and that was detected as anomalous communication with the model u1, as communication for analysis. From then on, the learning and detection server 9 learns communications that exclude communications that were detected as anomalous communications with the model d'1 or the model e'1 from the communications of the hosts 5d, 5e, and updates the model d'1 or the model e'1. Along with it, the learning and detection server 9 learns over-detected communication among the communications that were detected as anomalous communications by the model d'1 or the model e'1, and updates the model u1.

[Processing Procedure of Communication Processing]

Figure 17:
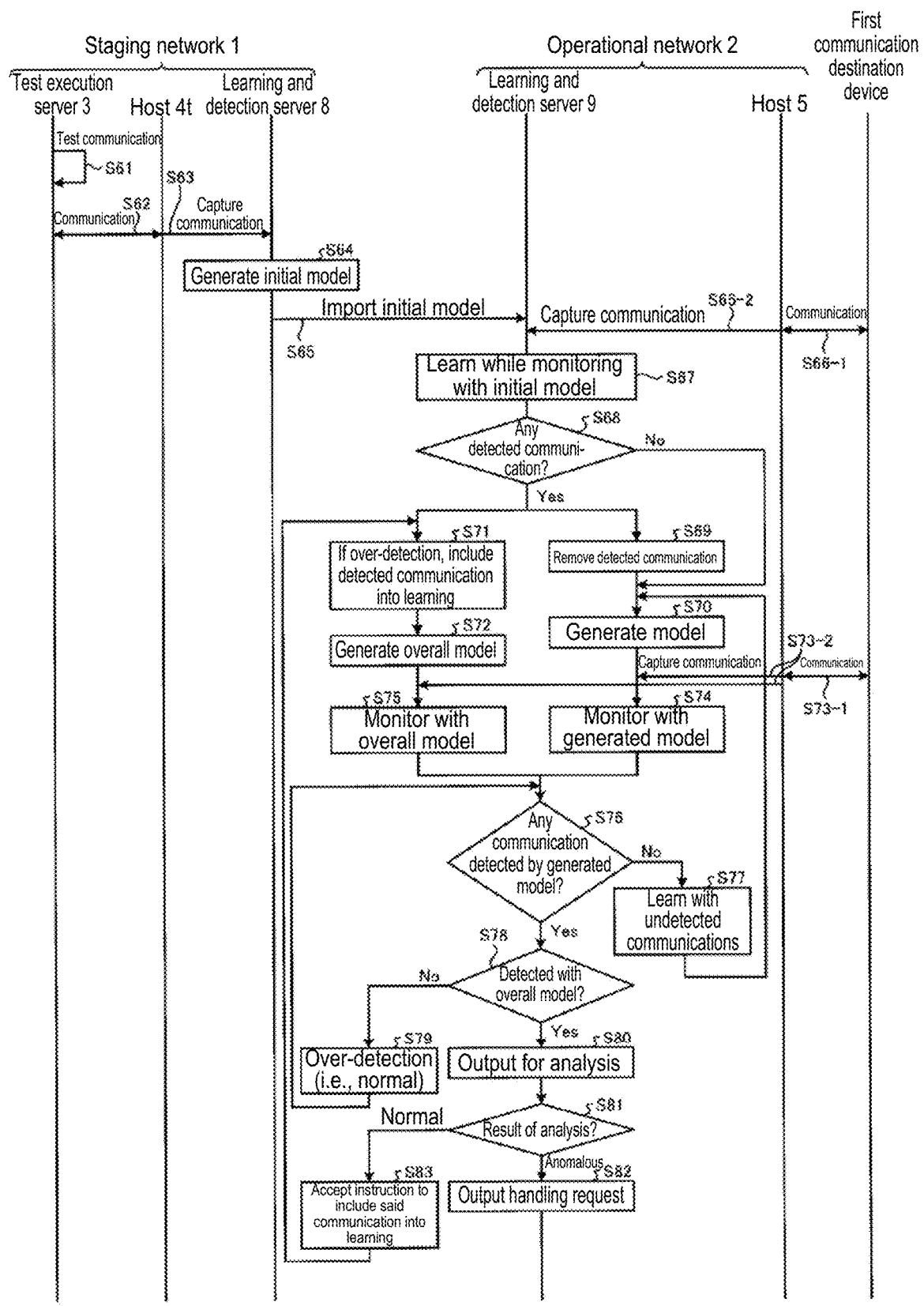
FIG. 17 is a sequence chart showing a processing procedure of communication processing according to Embodiment 3.

Next, the flow of communication processing in Embodiment 3 is described. FIG. 17 is a sequence chart showing a processing procedure of communication processing according to Embodiment 3.

Steps S61 through S66 shown in FIG. 17 have the same processing actions as the steps S1 through S6 shown in FIG. 6. Then, the learning and detection server 9 of the operational network 2 performs learning for generating the model for a new host 5 while monitoring communication between the host 5 and other device using the initial model (step S67). In doing so, the learning and detection server 9 of the operational network 2 determines whether there is any communication that was detected with the model for the host 5 (the initial model) (step S68).

If it determines that there is communication that was detected with the model for the host 5 (step S68: Yes), the learning and detection server 9 of the operational network 2 removes the detected communication from the communication of the host 5 (step S69), learns the communication of the host 5, and generates the model for the host 5 (step S70). In contrast, if it determines that there is no communication that was detected with the model for the host 5 (step S68: No), the learning and detection server 9 of the operational network 2 learns the communication of the host 5 as it is, and generates the model for the host 5 (step S70).

Then, when it determines that there is communication that was detected with the model for the host 5 (step S68: Yes) and if the detected communication is over-detected communication, the learning and detection server 9 of the operational network 2 includes the detected over-detected communication into learning (step S71), and generates the model for the overall operational network 2 (step S72).

The learning and detection server 9 of the operational network 2 captures (step S73-2) the communication between the host 5 and other device (e.g., the first communication device) (step S73-1), monitors the host 5 using the model generated at step S70 (step S74), and also monitors the overall operational network 2 using the model for the overall operational network 2 generated at step S72 (step S75).

Then, the learning and detection server 9 of the operational network 2 determines whether there is any communication that was detected with the model for the host 5 (step S76). If it determines that there is no communication that was detected with the model for the host 5 (step S76: No), the learning and detection server 9 of the operational network 2 performs learning using communications that were not detected with the model for the host 5 and updates the model for the host 5 (step S77).

In contrast, if it determines that there is communication that was detected with the model for the host 5 (step S76: Yes), the learning and detection server 9 of the operational network 2 determines whether that communication was also detected with the overall model (step S78). If it determines that the communication is not detected with the overall model (step S78: No), the learning and detection server 9 of the operational network 2 determines that the communication is over-detected communication, that is, it is normal (step S79), and returns to monitoring and detection for the next communication.

In contrast, if it determines that this communication was also detected with the overall model (step S78: Yes), the learning and detection server 9 of the operational network 2 outputs it to an external analysis device and the like for analysis (step S80). If a result of analysis on this communication shows it is anomalous (step S81: anomalous), the learning and detection server 9 outputs a request notice for handling the communication to an external handling device and the like (step S82). If the result of analysis on this communication shows it is normal (step S81: normal), the learning and detection server 9 accepts an instruction to include the communication into learning as over-detected communication (step S83), then includes the communication into learning as over-detected (step S71) and updates the overall model (step S72).

[Comparison with Conventional Technique]

Figure 18:
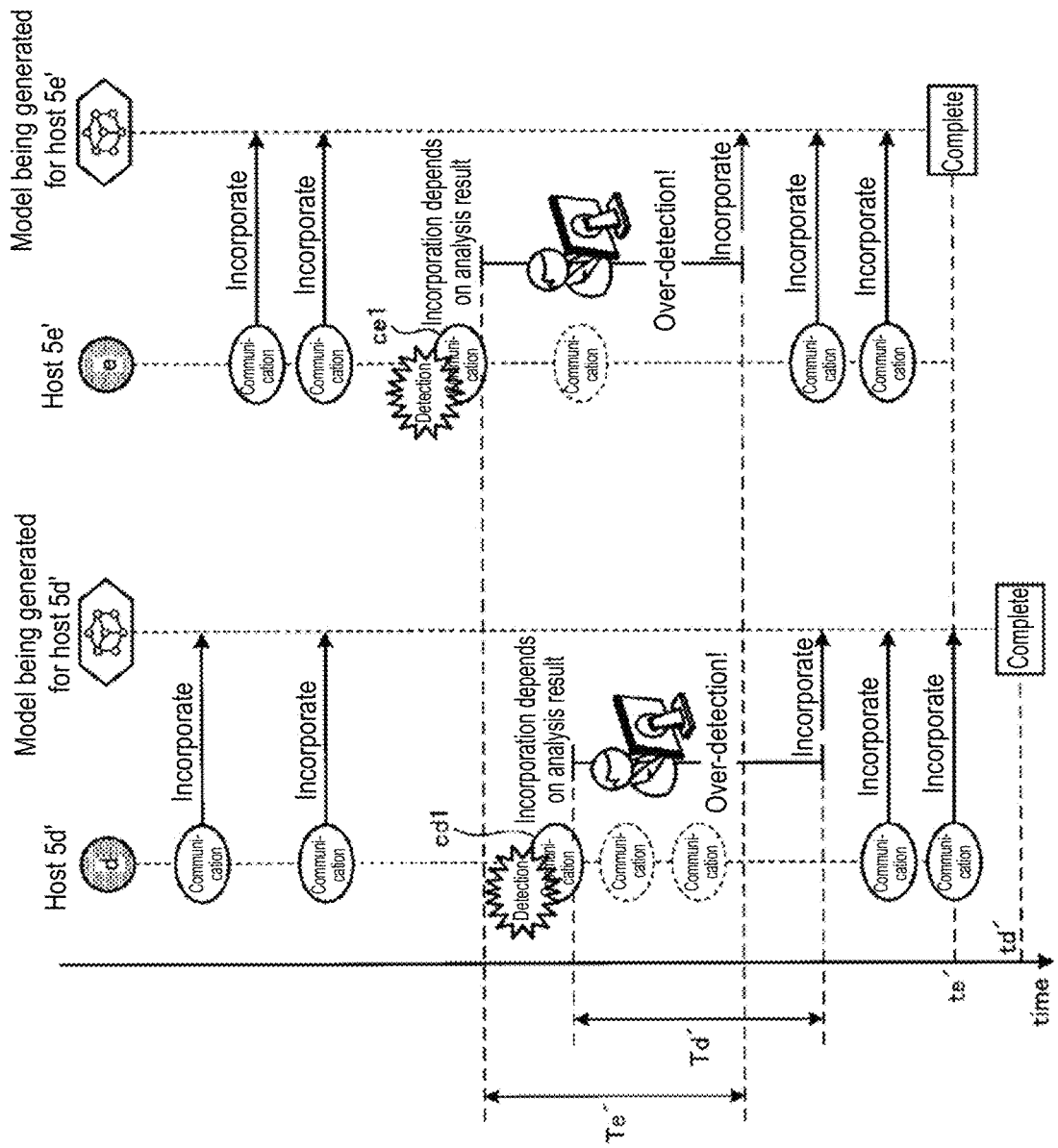
FIG. 18 is a diagram describing monitoring of communication and learning of over-detected communication in a conventional technique.
Figure 19:
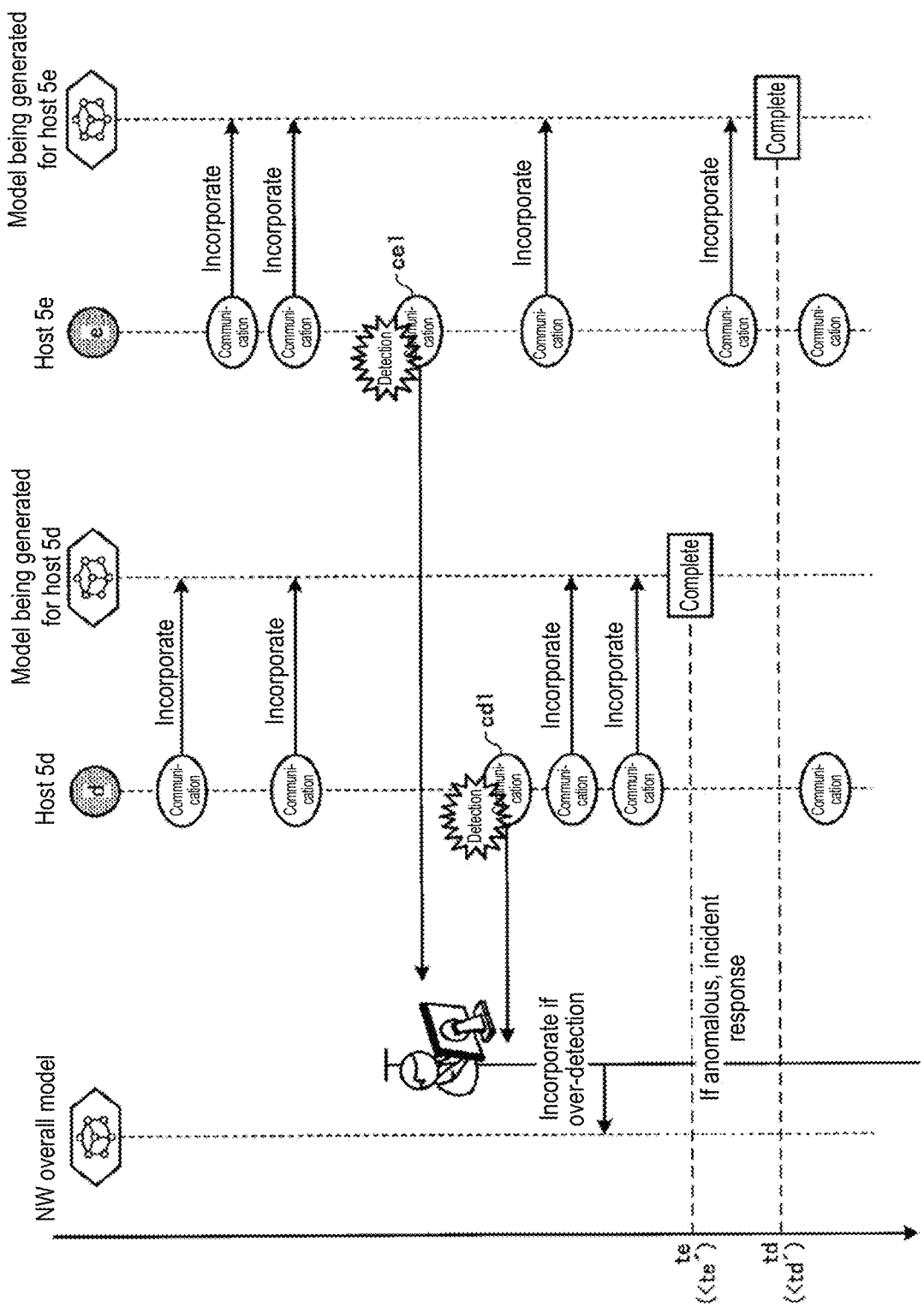
FIG. 19 is a diagram describing monitoring of communication and learning of over-detected communication in Embodiment 3.

Flows of communication processing in a conventional technique and in Embodiment 3 of the present invention are described. FIG. 18 is a diagram describing monitoring of communication and learning of over-detected communication in the conventional technique. FIG. 19 is a diagram describing monitoring of communication and learning of over-detected communication in Embodiment 3.

As shown in FIG. 18, the conventional technique requires waiting for a result of analysis from other analysis device or an analyst before determining whether to incorporate communication in which an anomaly has been detected (e.g., communication cd1, ce1) during incorporation of communications of the hosts 5d, 5e and generation of models. Thus, in the conventional technique, time period Td', Te' from when an anomaly in communication is detected to when the detected communication is analyzed as being over-detected communication and incorporated into learning is long, so that generation of the models for the hosts 5d, 5e takes time (e.g., time td', te').

In contrast, in Embodiment 3, if any anomaly in communications cd1, ce1 is detected while the communications of the hosts 5d, 5e are being incorporated and the models are being generated, the learning and detection server 9 of the operational network 2 excludes the communications cd1, ce1 from learning and completes the respective models for the hosts 5d, 5e, as shown in FIG. 19. Then, if the communication cd1, ce1 is over-detected communication, the learning and detection server 9 of the operational network 2 learns this over-detected communication and generates the model for the overall operational network 2.

As described above, Embodiment 3 employs a scheme of separating the model for the host 5 (the first model) from the model for the overall operational network 2 (the second model) and making the model for the overall operational network 2 learn over-detected communication. As a result, the learning and detection server 9 of the operational network 2 does not require the time period Td', Te' from when an anomaly in communication is detected to when the detected communication is analyzed as being over-detected communication and incorporated into learning. Thus, the amount of time to generate the models for hosts 5d, 5e can be reduced to td (<td'), to (<te') compared to the conventional technique.

As described above, in Embodiment 3, the learning and detection server 9 of the operational network 2 performs detection with the model for each individual host 5 and also with the model for the overall operational network 2 in the event of anomalous communication. Then, by comparing results of analysis obtained by the model for each individual host 5 and the overall model, the learning and detection server 9 of the operational network 2 can distinguish anomalous communication and over-detected communication from each other.

That is, Embodiment 3 employs a separated learning scheme of not including over-detected communication into the learning of the model for the host 5 (the first model) but including it into the learning of the model for the entire operational network 2 (the second model). As a result, Embodiment 3 enables generation of the models for hosts and learning of over-detected communication in a manner not being affected by communication associated with usage specific to the host 5 in the operational network 2 (over-detection) and without giving rise to the delay problem, thus suppressing the prolongation of a vulnerable period during the learning phase.

[System Configuration and Others]

The components of the devices depicted in the figures are intended to show functional concepts and do not necessarily require being physically configured as depicted. That is, the specific form of distribution or integration of the devices is not limited to the depicted ones but all of or some of them may be functionally of physically distributed or integrated in a desired unit depending on various kinds of load or condition of usage. Further, all or a certain portion of processing functions performed by each device may be implemented by a CPU and a program to be analyzed and executed by the CPU, or as hardware with wired logic. The estimation device 10, 210 according to the present embodiment can also implemented with a computer and a program, and the program can be recorded in a recording medium or provided through a network.

Also, of the various kinds of processing described in the present embodiment, all or some of processing described as being automatically performed may be manually performed, or all or some of processing described as being manually performed may be automatically performed in a known method. Additionally, the processing procedures, control procedures, specific nomenclature, information including various data and parameters shown hereinabove or in the drawings can be modified as desired unless otherwise specified.

[Programs]

Figure 20:
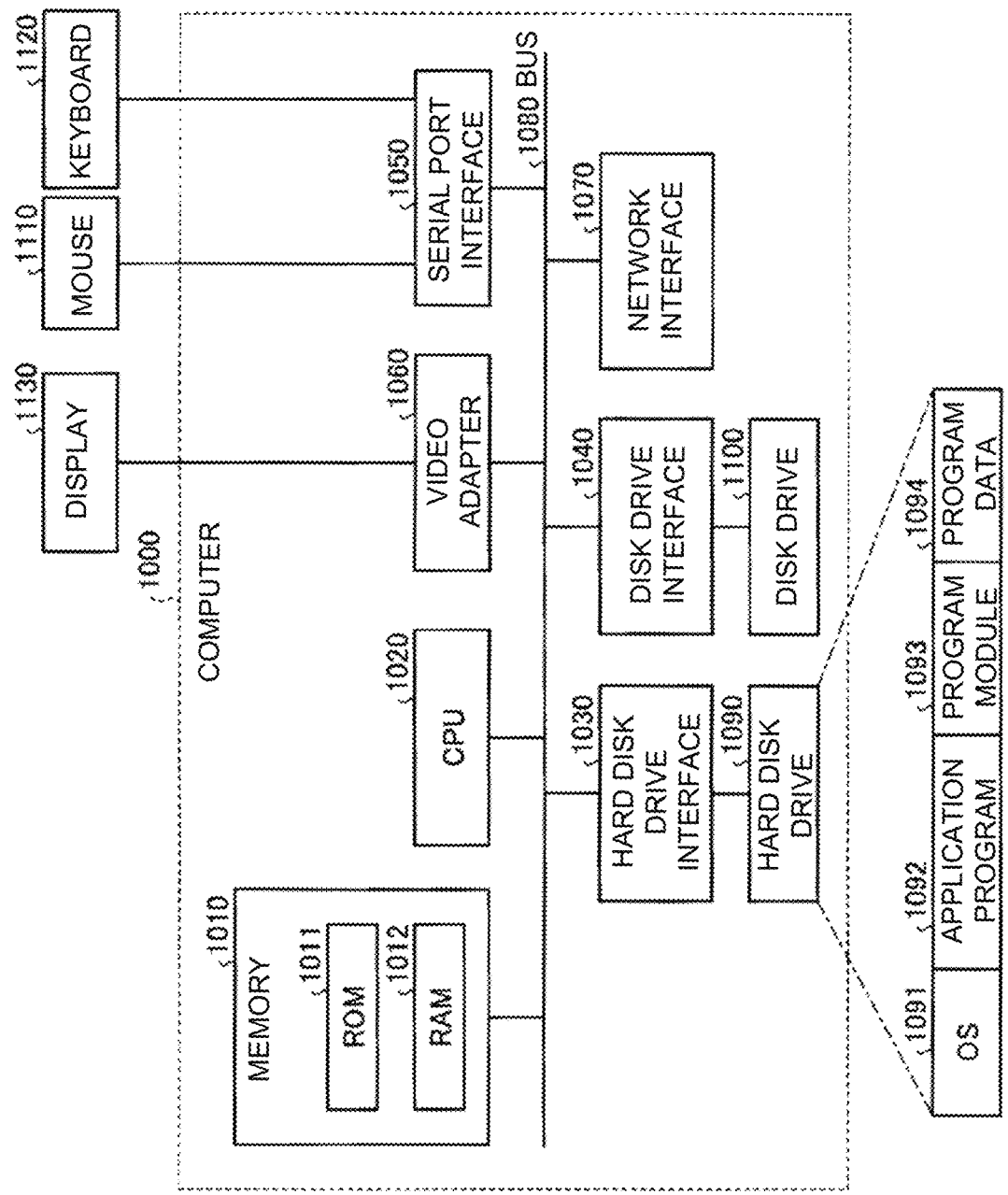
FIG. 20 is a diagram showing an example of a computer on which the learning and the detection server is implemented by the execution of a program.

FIG. 20 is a diagram showing an example of a computer on which the learning and detection server 8, 9 is implemented by the execution of a program. A computer 1000 has a memory 1010 and a CPU 1020, for example. The computer 1000 also has a hard disk drive interface 1030, a disk drive interface 1040, a serial port interface 1050, video adapter 1060, and a network interface 1070. These components are interconnected by a bus 1080.

The memory 1010 includes a ROM (Read Only Memory) 1011 and a RAM 1012. The ROM 1011 stores a boot program such as a BIOS (Basic Input Output System), for example. The hard disk drive interface 1030 is connected with a hard disk drive 1090. The disk drive interface 1040 is connected with a disk drive 1100. For example, a removable storage medium such as a magnetic disk or an optical disk is inserted into the disk drive 1100. The serial port interface 1050 is connected to a mouse 1110 and a keyboard 1120, for example. The video adapter 1060 is connected to a display 1130, for example.

The hard disk drive 1090 stores an OS 1091, an application program 1092, a program module 1093, and program data 1094, for example. That is, a program defining the processing of the learning and detection server 8, 9 is implemented as the program module 1093 in which code executable by the computer 1000 is described. The program module 1093 is stored in the hard disk drive 1090, for example. For instance, the program module 1093 for executing similar processing as those in the functional configuration of the learning and detection server 8, 9 is stored in the hard disk drive 1090. The hard disk drive 1090 may be replaced with an SSD (Solid State Drive).

Setting data for use in the processing in the above-described embodiments are stored in the memory 1010 or the hard disk drive 1090, for example, as the program data 1094. The CPU 1020 then reads the program module 1093 and/or the program data 1094 stored in the memory 1010 and the hard disk drive 1090 into the RAM 1012 and executes them as necessary.

The program module 1093 and the program data 1094 do not have to be stored in the hard disk drive 1090 but may be stored in a removable storage medium, for example, and read by the CPU 1020 via the disk drive 1100 and the like. Alternatively, the program module 1093 and the program data 1094 may be stored in another computer connected via a network (a LAN, a WAN (Wide Area Network), etc.). Then, the program module 1093 and the program data 1094 may be read from the other computer over the network interface 1070 by the CPU 1020.

While embodiments to which the invention made by the inventors have been applied have been described, the present invention is not limited by the description and drawings forming a part of the disclosure of the present invention with those embodiments. That is, other embodiments, examples, and operational techniques that are made by those skilled in the art based on those embodiments are all encompassed within the scope of the present invention.

REFERENCE SIGNS LIST 1 staging network
2 operational network
3 test execution server
4t, 5, 5a-5e, 5n host
8, 9 learning and detection server
11 communication unit
12 storage unit
13 control unit
121 model
131 learning unit
132 monitoring and detection unit
133 model sending and receiving unit

The invention claimed is:

1. A communication system including a first network and a second network,
the first network comprising:
a first communication device;
a testing device for performing a communication test by transmitting test communication in a normal state to the first communication device and receiving communication performed by the first communication device; and
a first server device for learning the test communication and the communication performed by the first communication device, generating an initial model for detecting an anomalous communication of the first communication device, and transmitting the initial model to the second network, and
the second network comprising:
a second communication device of the same type as the first communication device; and
a second server device for learning the communication of the second communication device and generating a first model for detecting an anomalous communication of the second communication device, while monitoring the communication of the second communication device using the initial model received from the first server device.

2. The communication system according to claim 1, wherein
the second server device transmits the first model to the first server device,
the testing device performs a first communication test,
the first server device uses the first model to detect anomalous communication from the test communication and from the communication performed by the first communication device in the first communication test,
the testing device performs a second communication test excluding the test communication that was detected as anomalous communication by the first server device, and
the first server device learns the test communication and the communication performed by the first communication device in the second communication test, generates a new one of the initial model, and transmits the new initial model to the second server device.

3. The communication system according to claim 1, wherein the second server device learns communications that exclude communications that were detected as anomalous communications with the initial model or the first model from the communication of the second communication device, and generates or updates the first model, and also learns over-detected communication that is normal among the communications detected as the anomalous communications, and generates a second model for detecting anomalous communications other than the over-detected communication.

4. The communication system according to claim 3, wherein the second server device identifies, as the over-detected communication, communication that was detected as anomalous communication with the first model and that was not detected as anomalous communication with the second model, and outputs communication that was detected as anomalous communication with the first model and that was detected as anomalous communication with the second model, as communication for analysis.

5. A communication method for execution by a communication system including a first network comprising a first communication device, a testing device, and a first server device, and a second network comprising a second communication device of the same type as the first communication device and a second server device, the method comprising the steps of:

- by the testing device, performing a communication test by transmitting test communication in a normal state to the first communication device and receiving communication performed by the first communication device;
- by the first server device, learning the test communication and the communication performed by the first communication device, and generating an initial model for detecting an anomalous communication of the first communication device;
- by the first server device, transmitting the initial model to the second server device; and
- by the second server device, learning the communication of the second communication device and generating a first model for detecting an anomalous communication of the second communication device, while monitoring the communication of the second communication device using the initial model received from the first server device.

* * * * *